US012699955B2

(12) United States Patent
Subramanian et al.

(10) Patent No.: US 12,699,955 B2
(45) Date of Patent: Aug. 4, 2026

(54) ALLY-ADVERSARY BIMODAL RESOURCE ALLOCATION OPTIMIZATION

(71) Applicant: International Business Machines Corporation, Armonk, NY (US)

(72) Inventors: Shivaram Subramanian, Frisco, TX (US); Pavithra Harsha, Pleasantville, NY (US); Ali Koc, White Plains, NY (US); Brian Leo Quanz, Yorktown Heights, NY (US); Mahesh Ramakrishna, East Brunswick, NJ (US); Dhruv Shah, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 205 days.

(21) Appl. No.: 17/965,070

(22) Filed: Oct. 13, 2022

(65) Prior Publication Data

US 2024/0135312 A1     Apr. 25, 2024

(51) Int. Cl.
    $G06Q\ 10/087$      (2023.01)
    $G06Q\ 10/0631$      (2023.01)
(52) U.S. Cl.
    CPC ..... $G06Q\ 10/087$ (2013.01); $G06Q\ 10/06315$ (2013.01)
(58) Field of Classification Search
    CPC .................. G06Q 10/087; G06Q 10/06315
    (Continued)

(56) References Cited

U.S. PATENT DOCUMENTS 10,423,923 B2     9/2019  Harsha et al.
2012/0010919 A1     1/2012  Aswal et al.
                    (Continued)

FOREIGN PATENT DOCUMENTS

WO     WO2022/003590 A1     1/2022

OTHER PUBLICATIONS

Unknown. Optimization of Hydrogen Cost and Transport Technology in France and Germany for Various Production and Demand Scenarios. Energies; Basel vol. 14, Iss. 3, (2021): 744. (Year: 2021).*

(Continued)

*Primary Examiner* — Fawaad Haider
(74) *Attorney, Agent, or Firm* — Harrity & Harrity, LLP

(57)                 ABSTRACT
Mechanisms are provided for generating a resource allocation in an omnichannel distribution network. Demand forecast data and current inventory data related to a resource and the omnichannel distribution network are obtained and an ally-adversary bimodal inventory optimization (BIO) computer model is instantiated that includes an adversary component that simulates, through a computer simulation, a worst-case scenario of resource demand and resource availability, and an ally component that limits the adversary component based on a simulation of a limited best-case scenario of resource demand and resource availability. The BIO computer model is applied to the demand forecast data and current inventory data, to generate a predicted consumption for the resource. A resource allocation recommendation is generated for allocating the resource to locations of the omnichannel distribution network based on the predicted consumption, which is output to a downstream computing system for further processing.

20 Claims, 6 Drawing Sheets

(58) Field of Classification Search
USPC .......................................................... 705/28
See application file for complete search history.

(56)                    References Cited

U.S. PATENT DOCUMENTS

2020/0143313  A1      5/2020  Ohlsson et al.
2022/0188767  A1*     6/2022  Rorro ............. G06Q 10/063118

OTHER PUBLICATIONS

Misic, Velibor et al. Data Analytics in Operations Management: A Review. 2019. (Year: 2019).*
"Crystal Ball", Oracle Corporation, accessed online Oct. 12, 2022, 8 pages.
"One-Minute Spotlight: Oracle's Crystal Ball", Oracle Corporation, 2008, 5 pages.
Asghari, Tooba et al., "A Location-Inventory-Pricing Supply Chain Network Design for Perishable Products Under Disruptions", Iranian Journal of Management Studies (IJMS) 2021, 14(3): 487-507, Jul. 2021, 21 pages.
Bertsimas, Dimitris et al., "A Scalable Algorithm for Two-Stage Adaptive Linear Optimization", arXiv:1807.02812v1 [math.OC] Jul. 8, 2018, 23 pages.
Bertsimas, Dimitris et al., "Adaptive Robust Optimization for the Security Constrained Unit Commitment Problem", IEEE Transactions on Power Systems, vol. 28, No. 1, Feb. 2013, 12 pages.
Bertsimas, D et al., "Pareto Adaptive Robust Optimality via a Fourier-Motzkin Elimination Lens", arXiv:2012.04419v3 [math. OC], May 5, 2022, 41 pages.
Chapman, S.J. , "The Kelly criterion for spread bets", IMA Journal of Applied Mathematics (2007) 72, 43-51, Advance Access publication on Dec. 5, 2006, 10 pages.
Jackson, Peter L. et al., "Multiperiod Stock Allocation via Robust Optimization", Management Science, vol. 65, No. 2, Feb. 2019, pp. 794-818, 26 pages.
Simchi-Levi, David et al., "Constraint Generation for Two-Stage Robust Network Flow Problems", INFORMS Journal on Optimization, vol. 1, No. 1, Winter 2019, published online Oct. 19, 2019, pp. 49-70, 23 pages.
Yanikoglu, Ihsan et al., "A Survey of Adjustable Robust Optimization, Adjustable Robust Optimization—A Survey and Tutorial", European Journal of Operational Research, Sep. 2019, 33 pages.
Zeng, Bo et al., "Solving two-stage robust optimization problems using a column-and-constraint generation method", Operations Research Letters 41 (2013) 457-461, Jun. 3, 2013, 5 pages.

* cited by examiner

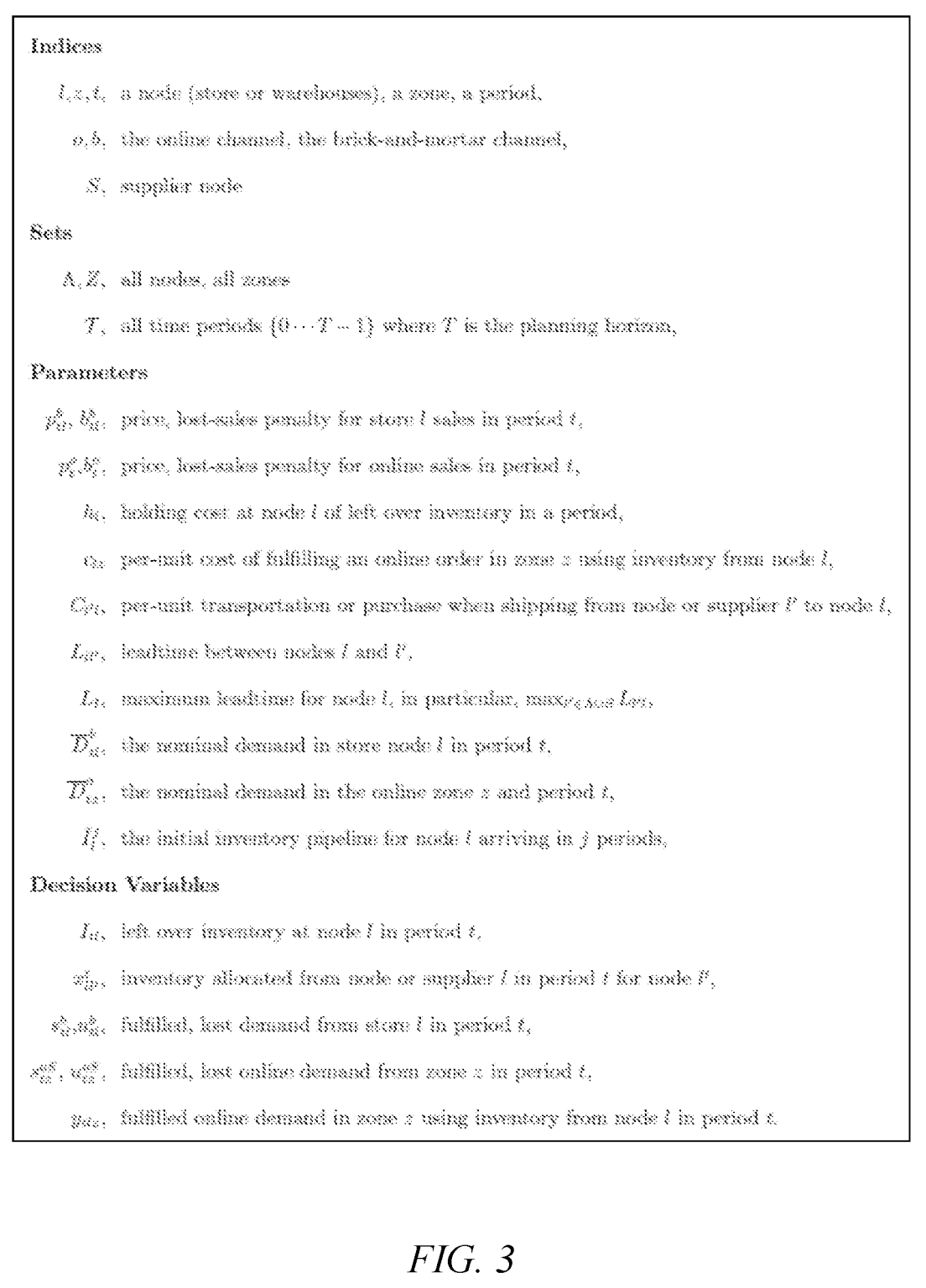

Indices

$i, z, t$, a node (store or warehouse), a zone, a period, $o, b$, the online channel, the brick-and-mortar channel, $S$, supplier node

Sets

$A, Z$, all nodes, all zones $T$, all time periods $\{0 \cdots T-1\}$ where $T$ is the planning horizon,

Parameters

$p_{it}^b, \delta_{it}^b$, price, lost-sales penalty for store $i$ sales in period $t$, $p_{zt}^o, \delta_{zt}^o$, price, lost-sales penalty for online sales in period $t$, $h_i$, holding cost at node $i$ of left over inventory in a period, $c_{zi}$, per-unit cost of fulfilling an online order in zone $z$ using inventory from node $i$, $C_{i'i}$, per-unit transportation or purchase when shipping from node or supplier $i'$ to node $i$, $L_{ii'}$, leadtime between nodes $i$ and $i'$, $L_i$, maximum leadtime for node $i$, in particular, $\max_{i' \in A \cup S} L_{i'i}$, $\bar{D}_{it}^b$, the nominal demand in store node $i$ in period $t$, $\bar{D}_{zt}^o$, the nominal demand in the online zone $z$ and period $t$, $I_j^i$, the initial inventory pipeline for node $i$ arriving in $j$ periods,

Decision Variables

$I_{it}$, left over inventory at node $i$ in period $t$, $x_{ii'}^t$, inventory allocated from node or supplier $i$ in period $t$ for node $i'$, $s_{it}^b, u_{it}^b$, fulfilled, lost demand from store $i$ in period $t$, $s_{zt}^o, u_{zt}^o$, fulfilled, lost online demand from zone $z$ in period $t$, $y_{zit}$, fulfilled online demand in zone $z$ using inventory from node $i$ in period $t$.

*FIG. 3*

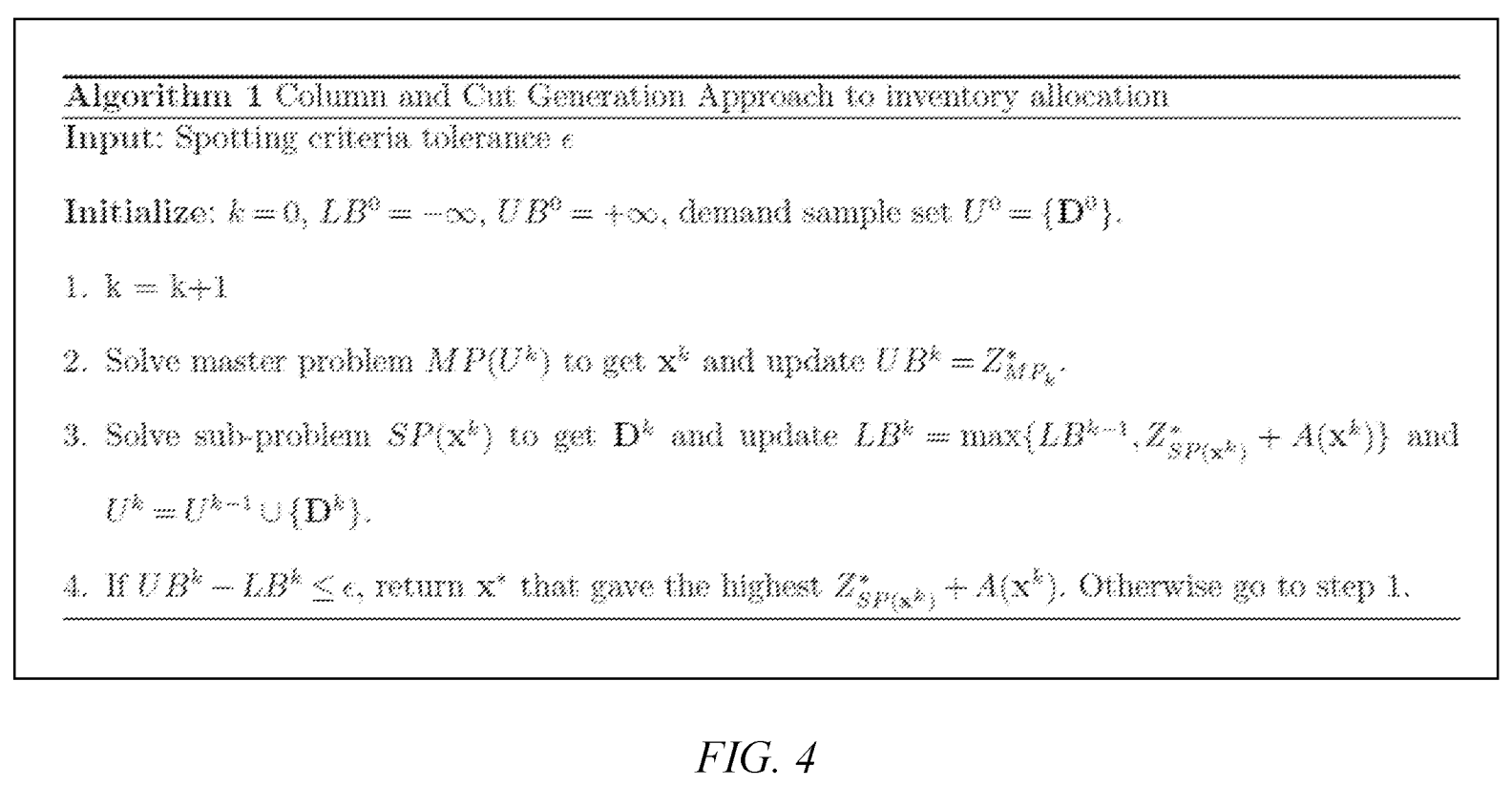

Algorithm 1 Column and Cut Generation Approach to inventory allocation

Input: Spotting criteria tolerance $\epsilon$

Initialize: $k = 0$, $LB^0 = -\infty$, $UB^0 = +\infty$, demand sample set $U^0 = \{\mathbf{D}^0\}$.

1. $k = k+1$

2. Solve master problem $MP(U^k)$ to get $\mathbf{x}^k$ and update $UB^k = Z^*_{MP_k}$.

3. Solve sub-problem $SP(\mathbf{x}^k)$ to get $\mathbf{D}^k$ and update $LB^k = \max\{LB^{k-1}, Z^*_{SP(\mathbf{x}^k)} + A(\mathbf{x}^k)\}$ and $U^k = U^{k-1} \cup \{\mathbf{D}^k\}$.

4. If $UB^k - LB^k \leq \epsilon$, return $\mathbf{x}^*$ that gave the highest $Z^*_{SP(\mathbf{x}^k)} + A(\mathbf{x}^k)$. Otherwise go to step 1.

*FIG. 4*

ALLY-ADVERSARY BIMODAL RESOURCE ALLOCATION OPTIMIZATION

BACKGROUND

The present application relates generally to an improved data processing apparatus and method and more specifically to an improved computing tool and improved computing tool operations/functionality for providing artificial intelligence and computer model simulation based decision support for resource allocation in the presence of consumption uncertainty, especially in omnichannel resource positioning infrastructures.

Traditional supply chain infrastructure use distribution centers and warehouses to stage goods/products prior to distribution to brick and mortar stores where customers may acquire the goods/products that they are interested in. Distribution centers are the places that allocate goods/products from the manufacturer to the business's warehouses, where human beings would manage the transfer of the stock received from the distribution center to the stores. However, with the advent of electronic commerce (ecommerce) these supply chain infrastructures have become more complicated and sophisticated. That is, with ecommerce, customers need not physically go to stores to obtain goods/products, and instead may utilize computing devices and computer networks to shop online by selecting such goods/products from retailer websites and having these items shipped to the customer directly, shipped to local stores where the customer may pick up the purchased goods/products, or even have the goods/products delivered to them by delivery services provided by the retailer and/or third party delivery services.

In order to address ever increasing demands of customers and increased usage of ecommerce mechanisms, retailers have started to ship goods/services between stores to bring the goods/services closer to the ecommerce customer, as well as increase the shipping directly from the stores to the customers. This has increased the complexity of the systems used to handle the various channels by which goods/products are purchased by customers and the goods/products are distributed and provided to customers. Retail cross-channel fulfillment has driven the growing number of consumer expectations, volatile demand, and cost pressures on logistics and transportation.

Omnichannel distribution networks integrate operations and physical product flows across all channels to provide a seamless experience, such that customers may complete a purchase and receive their goods/products using any channel they choose to utilize, e.g., online shopping, in-store purchasing, etc., or any combination of channels. Omnichannel distribution introduces various challenges that need to be address, especially with regard to increased complexity of logistics networks for handling various different distribution and delivery channels, the need to provide coordination between the various parties involved in the distribution and delivery channels from the good/product manufacturer all the way to the customer, as well as ever increasing demands of customers to provide reliable and convenient ways to purchase and received goods/products.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for generating a resource allocation in an omnichannel distribution network having a plurality of locations and channels for moving resources between locations. The method comprises retrieving demand forecast data and current inventory data related to a target resource and the omnichannel distribution network. The method also comprises instantiating an ally-adversary bimodal inventory optimization (BIO) computer model comprising an adversary component that simulates, through a computer simulation, a worst-case scenario of resource demand and resource availability, and an ally component that limits the adversary component based on a simulation of a limited best-case scenario of resource demand and resource availability. The method further comprises applying the BIO computer model to the demand forecast data and current inventory data, to generate a predicted consumption for the target resource across a plurality of locations in the omnichannel distribution network. In addition, the method comprises generating a resource allocation recommendation for allocating the resource to locations of the omnichannel distribution network, based on the predicted consumption for the target resource, and outputting the resource allocation recommendation to a downstream computing system to perform a downstream computing operation based on the resource allocation recommendation.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 3 is an example diagram showing notations for explaining inventory optimization formulations in accordance with the illustrative embodiments;

FIG. 4 is an example algorithm for a column and cut generation approach to inventory allocation in accordance with one illustrative embodiment;

DETAILED DESCRIPTION

Figure 1:
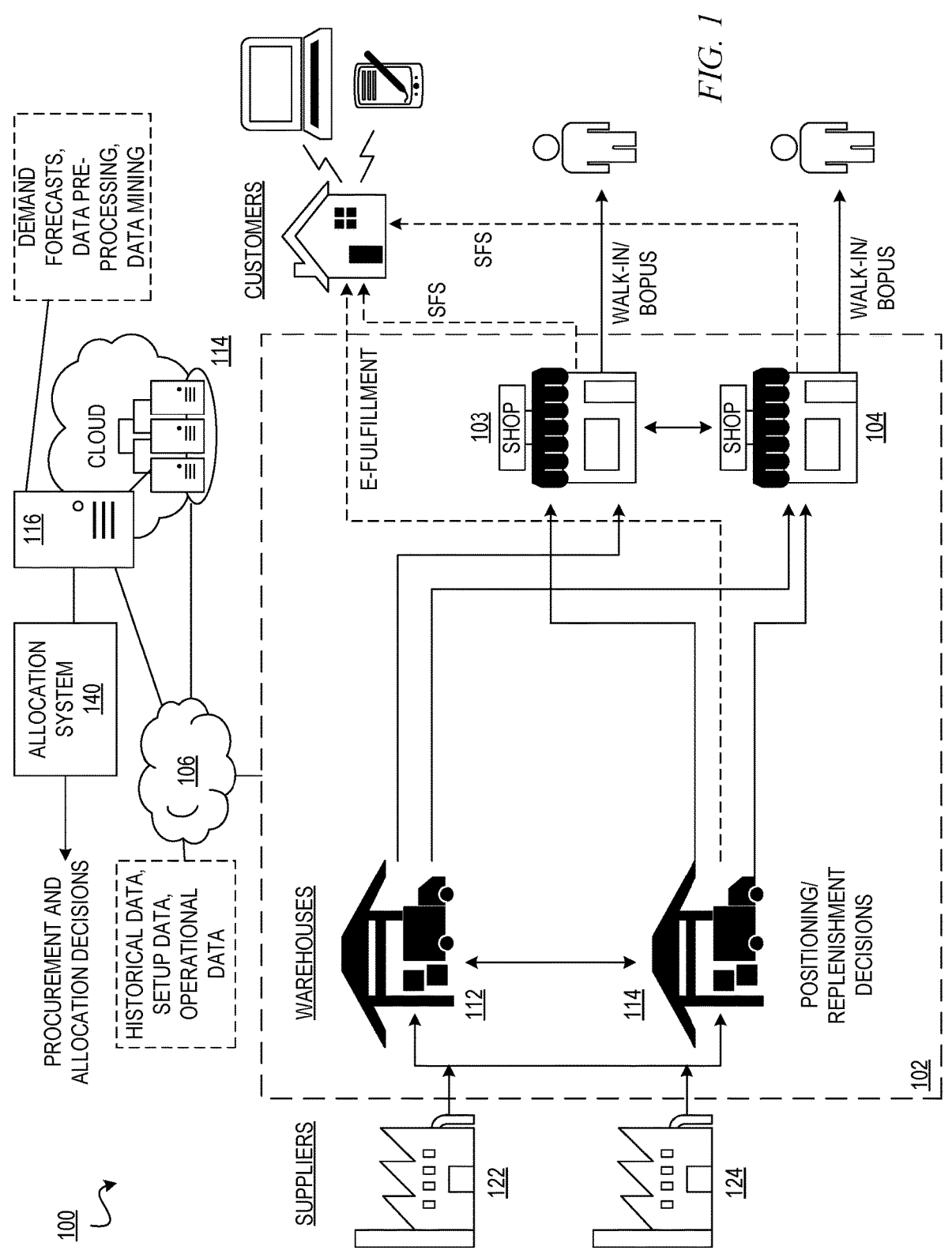
FIG. 1 is an example architecture in which aspects of a resource allocation system in accordance with one or more of the illustrative embodiments may be implemented.

The illustrative embodiments provide an improved computing tool and improved computing tool operations/functionality for providing artificial intelligence and computer model simulation based decision support for resource procurement and allocation, especially in omnichannel resource distribution infrastructures. The improved computing tool and improved computing tool operations/functionality not only look at the resource procurement and allocation operation from a worst case scenario based simulation, but also an expectation of the occurrence of best case scenarios. The illustrative embodiments simulate both worst case and best case scenarios together in a distribution-free manner, so as to introduce a measure of optimistic simulation into the resource allocation decision making in a systematic way that allows for the capturing of opportunities that worst-case scenario simulation does not capture. In a goods/product distribution environment, worst case scenarios are those where demand is misaligned with inventory resulting in increased holding costs and loss of sales. Best case scenarios are those where the demand is aligned with inventory resulting in lower holding costs and increased sales.

The computer model simulations performed by the mechanisms of the illustrative embodiments not only evaluate the resource allocation based on worst case demand uncertainty and fulfillment of the worst case demand, but also introduce measures of optimism in that specific mechanisms are provided to limit the lower bound of the worst case scenario by a limited best case demand simulation. Mechanisms are also provided to limit the amount of optimism introduced by these best case demand simulations as well so as to balance the worst case, or pessimistic, simulation with the best case, or optimistic, simulation. In so doing, rather than performing resource allocation only on worst-case scenarios and acquiring and moving resources to locations based on scenarios that should rarely occur, and thereby tying up resources in locations that turn out to be potentially be less optimal, the illustrative embodiments introduce a measure of optimism that permits a resource allocation that not only prepares for worst-case scenarios, but also acquires and locates resources to take advantage of potential positive opportunities.

While the following description will utilize exemplary embodiments in which the resources are goods/products that are being bought by customers from retailers, and an omnichannel distribution network, the illustrative embodiments are not limited to goods/products and corresponding goods/products omnichannel supply chain infrastructures. To the contrary, the illustrative embodiments may be implemented with any resource where allocation of the resource is to be managed under uncertainty over a time-and-space network. For example, any application where resource allocation is to be performed based on demand/supply forecasting and in the presence of demand/supply uncertainty may implement the mechanisms of the illustrative embodiments to facilitate decision making regarding inventory of resources at various locations within a resource distribution network.

One of the key functions in supply chains is to optimize inventory procurement and positioning so as to dynamically match supply of goods/products with time varying and inherently uncertain demand. In simple terms, excess supply availability, compared to demand, leads to carrying costs, while lower supply leads to out-of-stock costs, including potentially unhappy customers, both of which directly erode the profit margins of a company.

The immediacy of demand has driven today's supply chains to be agile and responsive. For example, modern ecommerce has opened up numerous delivery options with service guarantees, in addition to meeting walk-in demand, such as free shipping above a nominal value, same day delivery, free 2-day shipping, buy-online-pick-up-in-store in 2 hours, and the like. To meet the delivery contracts at the lowest cost while effectively utilizing their on-hand inventory, retailers have adopted ship-from-store fulfillment strategies whereby store inventories, besides those from the warehouse, can be flexibly used to meet the customer demand that needs to be shipped. Despite the nimbleness of the supply chain in meeting demand, retailers continue to be riddled with problems such as low margins due to excessive fulfillment costs, markdowns and returns, and more importantly, stock-outs, as inventory is not at the right place at the right time. The relaxed return options such as buy-online-return-in-store in 30 days, free shipping on returns within 60 days, not only have increased the return rates, but also have exasperated this issue.

In this complex and highly interconnected supply chain environment, positioning inventory at right place and time is a non-trivial problem that can be performed accurately as a mental process or organization of human activity. Firstly, inventory positions are driven by future demand predictions that varies by time and market segment (e.g., by channel, location, delivery option), and are influenced by many factors such as price, promotion, seasonality, holidays, other products and competitor effects. Statistical methods fail to capture short term trends and are unable to take advantage of any "information edge", e.g., the chance of a sales spike at some locations in the network due to external factors and context or provide predictions at the lowest level of granularity, e.g., individual product-channel-location level. Moreover, even with the best-in-class artificial intelligence and machine learning methods, the forecasts can be inaccurate, and it is important that inventory positioning approaches be designed to be robust and protect from such inaccuracies.

Inventory replenishment methods are simple rule-based techniques that model a single supplier-store relationship quite well, but fail to capture the complex inventory flows in networks with multiple suppliers\warehouses and multiple stores and channels. The rules are static and siloed by channel and lack the coordination needed with downstream fulfillment strategies like ship-from-store. In short, these approaches do not adequately account for demand forecasting inaccuracies, are not integrated across the omnichannel distribution networks, and are not coordinated with downstream operations.

Inventory allocation mechanisms take one of four main approaches to forecasting and inventory allocation. In a first approach, referred to as an expected value approach, inventory of resources, e.g., goods/products, is performed by equitably purchasing and allocating and/or (re-)distributing the resources to all locations, e.g., stores, in a round-robin fashion based on predicted "need" (positive part of demand minus inventory) and use distribution centers to provide online fulfillment. In this first approach, a nominal value is utilized for each location, rather than a distribution, e.g., stores gets X number of the good/product based on historical prediction of what that store will need. Such expected value approaches do not account for impact of demand uncertainty with no protection from worst-case outcomes. That is, these approaches assume that the "need" will be consistent and there is no uncertainty which is not a realistic assumption when applied to real-world data and real-world scenarios.

A second approach is referred to as safety stock optimization. In this approach, resource allocation is the same as above, but performed based on a quantile, e.g., 95th quantile, derived from a predicted demand distribution for both stores and online sales, for example. In this approach, a "buffer" of a number of resources may be defined based on the quantile to provide an estimate of the resource allocation to be provided to the particular location, e.g., 5 units+/−2 units. This safety stock optimization approach works well only when the locations are independent, as in the case when there is no online channel, there are just walk-in stores, and when the assumption of a thin-tailed distribution holds. Again, there is no protection from worst-case outcomes but there is some notion of demand uncertainty in this approach.

In a third approach, referred to as a stochastic programming approach, several network demand scenarios are utilized to optimize expected profit. Each scenario has its own probability of occurrence, or each scenario is sampled from probabilistic forecast estimates. This approach requires a large number of parameters to be evaluated and is a time-consuming process. As a result, the worst-case performance may be dropped from the evaluation when realized demands are far from the assumed, or average case, demand distribution, especially when the probabilistic forecast estimates are inaccurate.

A fourth approach, referred to as a robust optimization, optimizes the allocation for a worst-case (adversarial) demand, such as with both online and in-store demands, to guarantee performance and satisfaction of minimum service levels with confidence. This is a data-driven approach provides a unimodal optimization for worst-case outcomes that may be rare. As a result, the resource allocations cannot take advantage of sales opportunities, i.e., optimistic case scenarios. One example of a robust optimization mechanism for allocating product inventory to an omnichannel distribution supply chain is described in U.S. Pat. No. 10,423,923 issued to Harsha et al., entitled "Allocating a Product Inventory to an Omnichannel Distribution Supply Chain", and assigned to the same assignee as the present application, which is incorporated herein by reference.

In some illustrative embodiments, improved computer tools and improved computer tool operations/functionality are provided for allocating inventory of resources based on demand forecast data, such as demand forecasting ranges for example. The BIO computer model, in an adversary sense, models the demand as a worst case scenario simulation based modeling, while in an ally sense, recognizes limits on these worst case scenario simulations and models such limits as optimistic or best case scenario simulation additions, and eliminates the need to assume that the probability distribution of the demand will follow a certain pattern (e.g., a bell curve).

In accordance with some illustrative embodiments, the improved computer tools and improved computer tool operations/functional leverages a demand forecast that provides insight into future demand to drive channel allocations based on a predetermined confidence interval. As used herein, a channel may be any brick/mortar store, online store, catalogue, warehouse, clearance center, fulfillment center for ecommerce, 2-hour delivery, curb-side pickup or any other differentiated avenue through which resources may be provided to consumers of those resources.

The illustrative embodiments provide mechanisms that improve upon the robust optimization (RO) approach by introducing an ally-adversary bimodal (BIO) computer model simulation for resource allocation. In RO based resource allocation, given an allocation, an adversarial demand is selected for fulfillment and the objective/profit is computed. The RO mechanism searches over all possible demand realizations in an uncertainty set which is controlled by budget constraints, which are derived from probabilistic limit theorems, such as a central limit theorem.

One can view these as the most likely resource consumption scenarios. The RO mechanisms may result in skewed worst-case demands that do not align with inventory allocations. While such inventory is located to prepare for a worst-case scenarios that are conditional on the allocated inventory quantity, there are potential sales opportunities that such inventory is not able to satisfy. Skewed inventory allocations are therefore of little value in RO approaches because they result in no profit, e.g., inventory is not positioned to take advantage of sales opportunities. Thus, with RO mechanisms, optimal inventory allocation is distributed and uniform across locations, ignoring possible sales opportunities. In some illustrative embodiments, as described hereafter, techniques are provided that trade away from worst case goals by being optimistic in a data-driven fashion (i.e., without probabilistic demand forecasts) to improve the average case performance of robust methods.

The illustrative embodiments operate based on the observation that adversarial, or worst-case, demands modeled in RO mechanisms tend to be very rare events, especially when the initial state is skewed to begin with, i.e., inventories of resources (on-hand inventory) are not uniform across all locations, and may remain the case even after allocation (as it may not be profitable to make the entire system with an equal distribution of resources). The use of the budget constraints is still insufficient to moderate these adversarial (worst-case) demands. This is because the conditional worst-case demand (on the allocation) which are skewed to the inventory allocation can easily meet the budget constraints, yet are still rare, e.g., when initial inventory levels are relatively high. For example, suppose there are 3 locations-A, B and C and let A and B have 0 inventory to begin with and C have 5 units. Let the demand in each location be between 0 and 3 units and that the budget constraint is a minimum of 1 and a maximum of 6. Regardless of the inventory in location C, the robust optimization solution will state the conditional worst-case profit to be 0 but statistically, it is known that C might have at least 1 unit of sale. It is this type of optimistic behavior that is being captured by the mechanisms of the illustrative embodiments.

Moreover, RO mechanisms protect against cost spikes, but cannot exploit sales opportunities or take advantage of any 'information edge' such as potential sales spikes at a few locations, e.g., best case sales and cost scenarios. Put another way, RO mechanisms are overly focused on protecting against the downside scenarios and fail to take into consideration potential upside scenarios, e.g., instances where the omnichannel distribution network, or portions thereof, operate with increased sales and reduced costs. Thus, there is a need for an adversary modeling in RO mechanisms that is not overly adversarial.

With these observations in mind, the illustrative embodiments introduce an optimistic ally into the RO mechanisms by providing an ally-adversary bimodal inventory optimization (BIO) computer model simulation that seeks potential upsides. The BIO computer model simulation, in some illustrative embodiments, selects a few locations in the omnichannel distribution network to make "smart inventory bets" by simulating an upside scenario with regard to these locations. This simulation of the upside scenario moderates the adversary of the RO mechanism by selecting only a demand fraction of the budget constraint. For F example, assume the worst-case demand is 100, the adversary will misalign all these 100 units of demand to the allocation. In the BIO computer model simulation of the illustrative embodiments, for example, assume that a demand fraction of the budget constraint is specified, e.g., 5%, that is to be considered optimistic. As a result, 5% of the worst-case demand of 100, which is 5 units, are aligned with inventory and the remaining 65 are misaligned with inventory. This has the effect in the computer simulation of the BIO computer model of driving up sales in a best case, i.e., when demand aligns with inventory. Thus, the BIO computer model simulation protects against worst case shocks while also placing smart inventory bets on potential sales opportunities.

Furthermore, in an omnichannel environment, excess inventory resulting from optimistic sales expectations at store locations that do not materialize can always be used to fulfil e-commerce orders at other locations via the "ship-from-store" option, which further increases the value of the BIO computer model simulation illustrative embodiments in practice. It should be noted that increasing this demand fraction of the budget constraint, from 0 to 1, on a validation data set (i.e., reality data set), may result in a mix of aligned demand and misaligned demand. Thus, the out-of-sample performance may be poor as this fraction becomes larger. It has been determined that an inverted U shape behavior, having a small amount of optimism, actually improves the average case performance without giving up the worst-case protection, i.e., being overly optimistic can reduce performance. It has also been determined that the methodology can be more optimistic with larger initial inventories, but should be less optimistic when there is little or no initial inventory.

In some illustrative embodiments, in a goods/product distribution environment, the BIO computer model simulation models the retailer's goods/product allocation decision problem in three stages. The first stage (1) is where the allocation decisions are made along with the allied demand decisions (demand aligned or matched with inventory positions to the extent possible) are made. In a second stage (2), the adversary then chooses the worst case or the adversarial demand conditional based on the first stage allocation decisions. In a third stage (3), the retailer fulfills the resultant demands in the most profitable manner conditional on the decisions from stages 1 and 2. Note that there are different ways of identifying a resultant demand that is still within the feasible set of demand scenarios. In one approach, the allied and the adversarial demand are allowed to come from the full feasible set and take a linear superposition of the feasible set to identify the resultant demand, the linear superposition constant 2 being the specified budget fraction, such as discussed above. In another approach, the allied demand is allowed to restrict the set of adversarial demand by providing minimum demands in a given location.

The BIO computer model described above is a complex multi-stage decision making problem that employs a series of mathematical transformations to solve the corresponding allocation problem. In some illustrative embodiments, the solution is accomplished by first combining the $2^{nd}$ and $3^{rd}$ stages into a new-more complex $2^{nd}$ stage using duality theory. This complex $2^{nd}$ stage problem is bi-linear and hence non-deterministic polynomial-time (NP) hard by itself regardless of the stage 1 decisions. This means that existing solvers cannot be used to solve this problem directly. Instead, with the BIO computer model, it is first assumed that the adversarial demand can only take discrete demand values and the BIO computer model uses relaxation and linearization techniques to re-write the second stage as a linear optimization problem. Note that this can be given directly to linear optimization solvers that can operate on the linear optimization problem and provide the solution, thus, a more detailed discussion of solving the linear optimization problem with solvers is not provide herein.

Alternatively, one can use alternating heuristic methods to solve the problem heuristically, which is an approach that alternates between the adversarial demand and the dual variables of the $3^{rd}$ stage that are now in the complex second stage. This alternating heuristic will always converge but possibly to a local optima. So, to solve the overall problem with the first and second stages together, a Benders Decomposition technique is utilized that alternates between a master problem and a sub-problem. The master problem comprises the stage 1 decisions with previous elicited worst case scenarios. The sub-problem, which is the complex stage 2 problem, is solved given stage 1 decisions (approximately or exactly) to generate the elicited scenarios that then are used in the master model. These iterations are seeded with an initial allocation, or even a zero allocation, that then triggers the first adversarial demand scenario that will be used by the master model. The BIO computer models solution stops when the profitability objective computed by the restricted master (restricted by the limited number of scenarios of adversarial demand that it sees) and the sub-problem converge. Other practical stopping criteria can be adopted such as time limit or iteration count, etc. without departing from the spirit and scope of the present invention. If all steps are exact, the last allocation is chosen, else the allocation that has the best estimated sub-problem objective is chosen.

In net, the BIO computer model comprises an ally engine that generates a sequence of beneficial allocations and allied demands. The BIO computer model further comprises an adversary engine that works in conjunction with the ally engine to generate adversarial demand, however this adversarial demand is limited by the optimistic beneficial allocations, i.e., the allied demands and the resultant optimistic sales of the ally engine. The adversarial and ally engines operates until they converge on their achieved profitability objectives.

In one illustrative embodiment of the BIO computer model, the ally engine operates to identify allocations and a subset of "best case" demand locations and their demands jointly. In this illustrative embodiment, the number of best case locations are not limited, however in other illustrative embodiments, the number of best case locations may be limited based on a hyperparameter K. Regardless of whether the best case locations are limited or not limited, the resultant demand here is a superposition of the best and worst case demand with a specified, e.g., user-specified or specified by automated computing algorithms, time dependent factor $\lambda$ which is a fraction of the demand budget constraint, e.g., 5%, 10%, 25%, 50%, or the like, best case demand portion of the demand budget.

In other illustrative embodiments, the BIO computer model is configured to allow the superposition parameter to vary by location, making it a variable but restricting the total allied demand to the budget constraint. Although this is more flexible than the previously mentioned embodiments, the resultant demand scenario-superposed allied and adversarial demand, may violate the "budget of uncertainty" constraints and additional constraints can be added to recover feasibility to these constraints. However, if such feasibility to the uncertainty-budget constraints are ignored, the solution will nevertheless yield a feasible allocation, i.e., satisfy the fundamental demand-supply constraints.

In other illustrative embodiments, the ally engine of the BIO computer model identifies allocations and their corresponding allied demand lower bounds within a budget by computing the allied demand lower bounds via a round-robin or optimization based computation. These form lower bounds to the worst-case demand. In some illustrative embodiments, simulation optimization is utilized to derive a central limit theorem based dynamic lost sales or sell through constraint, or its normalized alternative using training data (something the other illustrative embodiments do not require), and imposing that in the sub-problem (second stage) there is no allied demands derived in the first stage. Note that one can view this method as restricting the adversarial actions even though allied demands are absent. Of course, a combination of two or more of these embodiments may also be utilized. The hyperparameter $\lambda$, i.e., the best case demand portion or fraction of the demand budget, and possibly the hyperparameter K, i.e., the number of locations with optimistic demand, are used to control the balance between optimism and adversity in the demand scenarios modeled by the BIO computer model.

Each of these illustrative embodiments introduces an ally demand, along with a conditional adversarial, or worst case, demand scenario that allows for planning based on realistic limitations to worst case scenarios. The result are more realistic resultant demand scenarios that allow for capturing opportunities that worst-case scenario based RO mechanisms miss. This in turn provides improved resource allocation to locations in an omnichannel network that increases desirable results, such as profits in the case of sales of goods/products, and a significant reduction in post processing iterations required to converge to the best inventory decisions that are practically acceptable to the user.

Before continuing the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular technological implementation for accomplishing and/or performing the actions, steps, processes, etc., attributable to and/or performed by the engine, but is limited in that the "engine" is implemented in computer technology and its actions, steps, processes, etc. are not performed as mental processes or performed through manual effort, even if the engine may work in conjunction with manual input or may provide output intended for manual or mental consumption. The engine is implemented as one or more of software executing on hardware, dedicated hardware, and/or firmware, or any combination thereof, that is specifically configured to perform the specified functions. The hardware may include, but is not limited to, use of a processor in combination with appropriate software loaded or stored in a machine readable memory and executed by the processor to thereby specifically configure the processor for a specialized purpose that comprises one or more of the functions of one or more embodiments of the present invention. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

It should be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

As mentioned above, the illustrative embodiments improved upon the worst-case scenario based robust optimization (RO) mechanisms by providing an ally component to limit the worst-case, or adversarial, component of the RO mechanisms. In order to more clearly describe the improvements provided by the illustrative embodiments, an example RO mechanism, in accordance with commonly owned U.S.

U.S. Pat. No. 10,423,923, will first be described followed by a description of the improvements provided by the illustrative embodiments. It should be appreciated that the description of the RO mechanism provided hereafter is only an example and is not intended to state or imply any limitation as to the RO mechanisms with which the ally-adversary bimodal inventory optimization (BIO) computing tool may be utilized or may provide an improvement over.

With reference now to FIG. 1, an example architecture 100 is depicted that may be used to implement an inventory allocation system employing the ally-adversary BIO computer models in accordance with one or more of the illustrative embodiments. Architecture 100 includes an omnichannel distribution system 102 that may be used to distribute a good/product. The omnichannel system 102 may include various brick and mortar locations, e.g., stores 103-104 that may be at different physical locations. For example, shop 103 may be in New York, while shop 104 may be in Los Angeles.

The omnichannel distribution system 102 may include one or more warehouses 112-114, where products may be received from various manufacturers or venders 122-124. In some embodiments, a warehouse 112 may be a preliminary repository for a product that can then be distributed to secondary channels, such as brick and mortar stores 103-104 or e-commerce warehouses 112-114, sometimes referred to as e-fulfillment centers. In some illustrative embodiments, a third party supplier 122, 124 may be included in the omnichannel distribution system 102, who is a supplier from whom a retailer purchases goods/products and then allocates these goods/products within the omnichannel distribution system 102 of warehouses 112-114 and/or stores 102-104. Both distribution mechanisms can also occur simultaneously as well. E-fulfillment centers, such as warehouses 112-114, aim to accommodate online (or catalogue) orders. In the omnichannel distribution system 102, a brick and mortar store, such as store 103, can accommodate both walk-in customers, buy-online pickup in store (BOPUS) customers, and e-commerce customers, who may be far away from the store 103, using a retailer-initiated ship-from-store fulfillment. Accordingly, store inventory can be used to satisfy both in-store demand, BOPUS demand, and online demand. On the other hand, warehouses 112-114 and/or e-fulfillment centers have no-walk in customers and cater predominantly to online demand.

To reduce fulfillment cost and provide better customer service, an e-fulfillment center is ideally located within a convenient shipping distance from the purchase destination of a product that has been ordered online. The omnichannel distribution system 102 allocates inventory to maximize margins and reduce order fulfillment cost. Setting up new e-fulfillment centers may be costly. Accordingly, in one embodiment, omnichannel retailers can use existing brick-and-mortar store 102-104 inventory to fulfil online orders when regular e-fulfillment centers are out of stock.

Each channel in the omnichannel distribution system 102 generates sales and lost sales data that may be provided to an allocation system 140, such as may be provided on server 116 and/or data store 114, over a network 106. The network 106 may be, without limitation, a local area network ("LAN"), a virtual private network ("VPN"), a cellular network, the Internet, or a combination thereof. For example, the network 106 may include a mobile network that is communicatively coupled to a private network, sometimes referred to as an intranet that provides various ancillary services, such as communication with a data store 114 and the allocation system 140 of server 116. To facilitate the present discussion, network 106 will be described, by way of example only and not by way of limitation, as a mobile network as may be operated by a carrier or service provider to provide a wide range of mobile communication services and supplemental services or features to its subscriber customers and associated mobile device users.

The data store 114 is a data repository that is configured to store historical data, setup data, current inventory data, and the like, for one or more goods/products. Examples of the historical data may comprise TLOG data, orderline data, historical inventory data, and historical replenishment data. Examples of setup data may include good/product SKU, network data, transfer network data w/lead time information, logistics and carbon costs data, fulfillment cost data, capacity constraints data, and service level goals. Examples of operational data includes internal/external factor data, current inventory data, supply orders in-transit data, and actual customer order data.

For example, the product may be a next generation mobile device that has a planned introduction to the market, or is already being sold in the market. In this regard, historical data from a similar mobile device (e.g., prior generation, another similarly situated mobile device, etc.,) may be retrieved from the data store 114 by the allocation system 140 of server 116 for data analysis to forecast an appropriate number of products for each channel of the omnichannel distribution system 104 for different time segments and different locations. This may be done in a pre-season allocation operation, for example. In other cases, where the good/product is already being sold in the market, collected historical information for the good/product may be retrieved, along with related ones, and artificial intelligence/machine learning (AI/ML) mechanisms, and the like, may be used to generate demand forecast required for procurement and allocation of the good/product within the omnichannel distribution system 102. The goal of generating forecasts is to generate potential demand at a granular level, typically an SKU-location-fulfillment channel level. For example, for walk-ins, demand is at the SKU-store level, and for online it is at the SKU-zone level. By zone what is meant is a geographical cluster of neighboring zip codes over which online demand is computed. In various embodiments, the zones may be based at different levels of granularity and may overlap, such as countries, regions, states, zip codes, or may be of finer resolution, such as a particular address. Typically, shipping cost for all zip codes within that zone is the same from any other location.

In terms of time granularity, it is at the level required by the replenishment cycle which indicates how often replenishment or allocation decisions are reviewed. For example, if replenishment is weekly, then the forecasts are at the SKU-node-week level. Due to the presence of lead times, multi-period forecasts may be generated.

To incorporate demand uncertainty in decision making, in some embodiments, mean or nominal demand is generated and a polyhedral set is provided. In some cases, a full distribution, a parametric distribution like a Poisson or Normal or a non-parametric distribution with quantiles are provided. The allocation system 140 of the server 116 applies advanced analytics that predict demand of the product at various levels of hierarchy of the market (e.g., store location, zone, channel, time period). This is similarly a distribution. A higher level is not essential if the forecasting is consistent and coherent across levels, else a higher level forecast is beneficial. Additionally, static data and operational data, like current inventory data, for example, may be retrieved from the data store 114 by the allocation system 140 so as to make allocation decisions based on these inputs to maximize total profitability.

The allocation system 140 provides the recommended allocation of the product at different channels of the omnichannel distribution system 102 at the right time to minimize a calculated worst case scenario for distribution and, in accordance with the improvements set forth herein, to take advantage of potential sales opportunities represented by the ally component and optimistic limits on the adversarial or worst-case engine simulations, as provided in the BIO computer model. Accordingly, the availability of a product is accurately aligned with its channel, zone, and time period to avoid a worst case scenario based SFS fulfillment cost and lost sales in each channel while also taking into account sales opportunities as "smart inventory bets". The architecture of the allocation system 140 is discussed in greater detail hereafter. Moreover, the following discussion will first assume an adversary, or worst-case scenario, based computer modeling and simulation, such as may be provided by an adversary component, or engine, of a BIO computer model simulation, and thereafter will further explain the improvements of the illustrative embodiments to introduce the ally component, or engine, to the ally-adversary BIO computer model simulation.

As used herein, the term robust omnichannel allocation refers to increasing confidence in the omnichannel nominal demand forecasting model, even when the situation may change from the forecasting model. Thus, the robustness is with respect to the uncertainties in the future. For example, in robust optimization (RO), a certain measure of robustness, referred to herein as a tolerance interval, is sought against uncertainty that can be represented as a variability in the value of the parameters of the problem itself and/or its solution. The robust allocation of the product discussed herein identifies solutions that are immune from perturbation within a predefined uncertainty (i.e., tolerance interval). By virtue of using the robust allocation of the target product, the uncertainty in demand due to the planned allocation is bounded. Thus, the robustness of allocation pattern to the omnichannel distribution system is increased by minimizing the combined worst case SFS fulfillment cost and lost sales in both channels. Moreover, in accordance with some illustrative embodiments, the worst case SFS fulfillment cost and lost sales may be further evaluated with regard to a measure of optimistic limits on the worst case provided by an ally component, as discussed hereafter. Each of these concepts are discussed in more detail below.

For example, a best fit optimization module may be implemented in the allocation system 140 which determines the worst case scenarios (among different scenarios) for product allocations for the distribution channels together. It will be understood that calculating all possible allocations, and the corresponding different scenarios, in order to identify the conditional worst case and best case scenarios may not be practical. In this regard, the illustrative embodiments provide an efficient way of focusing attention to particular groups of data in order to quickly identify the robust allocation. For example, not all worst-case demand scenarios (e.g., a 3-sigma deviation in the same direction) at every location are likely to occur simultaneously. There may be a canceling out effect that is common, for example, when demands are aggregated across locations or channels. For example, brick-and-mortar store demand may be higher than expected as well as online demand, but the total market size of brick-and-mortar demand and online demand remains close to the forecast. Such expectations are used to construct a practical uncertainty set that imposes restrictions on the total uncertainty at different levels.

In one aspect, implicit enumeration may be used such that in practice only a small fraction of the total number of feasible scenarios have to be evaluated to determine the best allocation for a given input value for the budget of uncertainty. The number of possible allocation decision vectors is finite but may grow exponentially as the inventory to be allocated and the number of store locations increases. For example, if there are N units of inventory to be allocated to M locations (even with a single channel), the number of possible combinations is in the order of $O(M^N)$. If one considers the omnichannel distribution system, the difficulty of the problem further increases due to cross-channel fulfillment (e.g., ship from store) possibilities using shared inventory, which can significantly impact the allocation patterns.

The worst case scenario may be identified in various ways. For example, a $\pm 3\sigma$ deviation or a predetermined percentage variation from nominal demand for each channel may be used for different time periods based on the historical data. More advanced approaches, which are discussed in the context of some calculations later, may involve specialized software and/or hardware. For example, the calculations may be performed using Java programming language that is executed on the product allocation server 116. Various optimization software packages may be used to perform the calculations. In one embodiment, IBM ILOG CPLEX Optimizer provides flexible, high-performance mathematical programming solvers for linear programming, mixed integer programming, quadratic programming, and quadratically constrained programming problems, which may be used as part of the allocation system 140. These packages include a distributed parallel algorithm for mixed integer programming to leverage multiple computers to solve difficult problems, such as the robust allocation of a product in the omnichannel distribution system discussed herein. Based on a desired confidence interval, the inventory for the product is allocated based on the robust allocation of the good/ product on the various channels to avoid a worst case scenario SFS fulfillment cost and lost sales in the various channels.

Consider an omnichannel retailer with multiple locations, e.g., stores, distribution centers, warehouses, and the like, which are referred to as nodes, such as the example shown in FIG. 1. The retailer faces walk-in and e-commerce demand and uses the inventory in the stores and warehouses to fulfill the demands in various channels. The goal of the retailer is to purchase inventory from a supplier and (re-) distribute this and the existing inventory from different nodes of the network to other nodes of the network to maximize profitability over a finite forward looking time horizon. The main challenge in this problem is that demand in various channels is uncertain and thus, the purchase and distribution decisions have to be made under a measure of uncertainty. Depending on how this demand is modeled for decision making, different inventory optimization formulations may be generated, such as the robust optimization (RO) formulation that we discuss below for completeness. The illustrative BIO embodiments improve upon the RO formulation by introducing an ally component to the adversary component of the RO formulation based computer model. Hereafter various illustrative embodiments for implementing an ally-adversary bimodal inventory optimization (BIO) computer tool implementing a BIO computer model, and corresponding BIO computer model and computer tool operations/functionality are provided. These illustrative embodiments are example embodiments that are not intended to be limiting on the present invention. To the contrary, other computer modeling may be utilized, as will be readily apparent to those of ordinary skill in the art in view of the present description, to introduce an ally component to a robust optimization (RO) adversary component without departing from the spirit and scope of the present invention.

Figure 2:
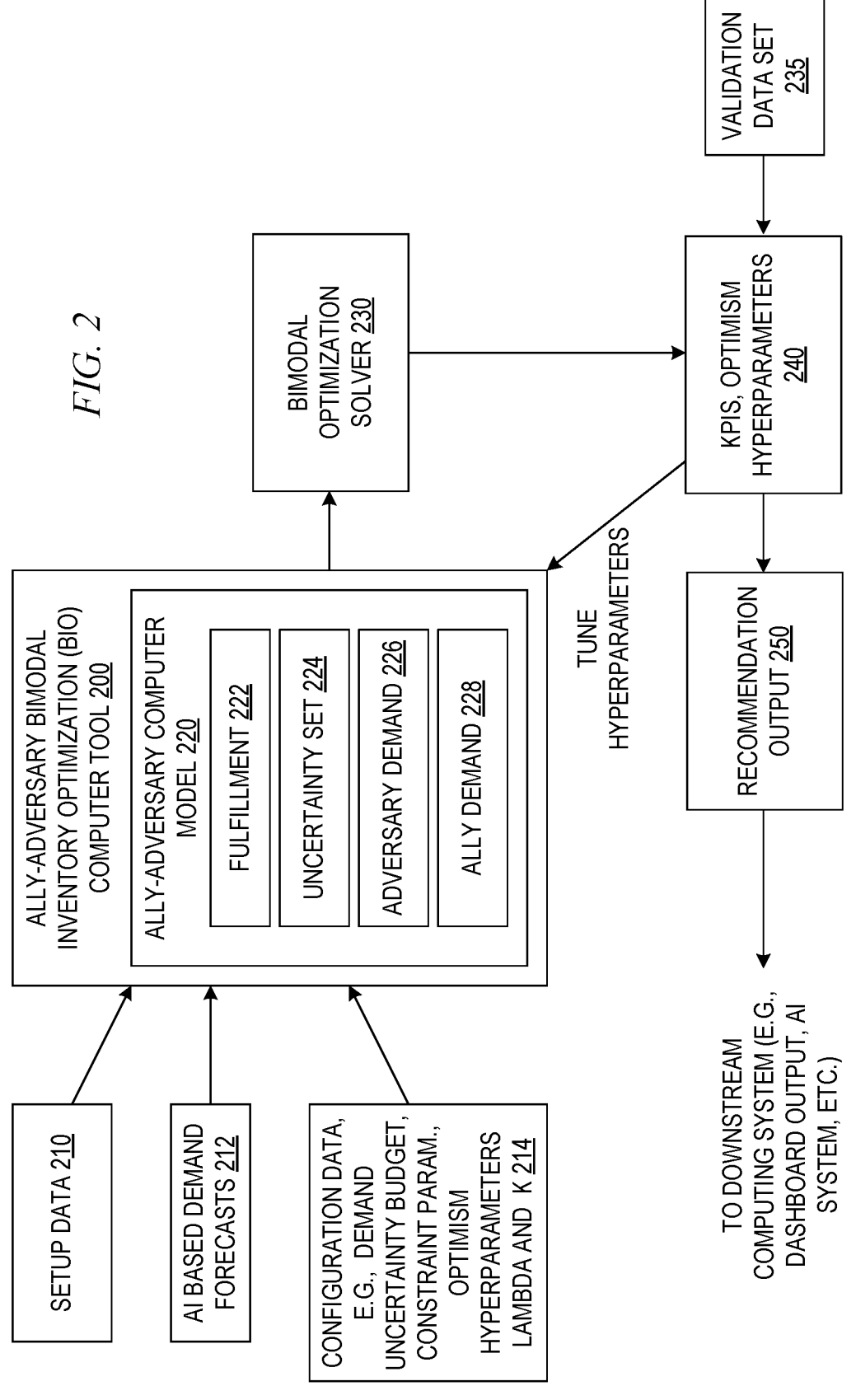
FIG. 2 is an example block diagram of one illustrative embodiment in which an ally-adversary bimodal inventory optimization (BIO) computer tool is implemented.

FIG. 2 is an example block diagram of one illustrative embodiment in which an ally-adversary bimodal inventory optimization (BIO) computer tool is implemented. As shown in FIG. 2, the BIO computer tool 200 operates on various data types 210-214 which may include setup data 210 which may specify initial inventory levels and other setup information for initiating the operation of the ally-adversary BIO computer model 220 of the computer tool 200, artificial intelligence/machine learning (AI/ML) demand forecast data 212 by location, channel, and time period, and ally-adversary bimodal inventory optimization (BIO) computer tool configuration data 214. By AI/ML based hierarchical demand forecasts 212, what is meant is forecasts at the channel-time period level across all locations, as well as granular channel-location-time period level. The higher level is not necessary if the forecasts are consistent across levels, in which case lower level forecasts can be aggregated. However, often the forecast are not consistent across levels, and even if they are, their mean is from the perspective of a statistical mean, but not the full distribution. With the higher level forecast, as part of the configuration data 214, budget constraints can be created for the demand scenarios across locations, as well as hyperparameters for configuring the BIO computer tool, such as demand uncertainty budget constraint parameters and optimism hyperparameters $\lambda$ and K.

As shown in FIG. 2, the inputs 210-214 are data mined and provided to the BIO computer tool 200 which implements an ally-adversary computer model 220 that operates to optimize an objective function for maximizing a worst-case performance, e.g., a worst-case profit margin in the case of sales of goods/products. The computer model 220 comprises a fulfillment component 222, a worst-case demand uncertainty set component 224, a worst case (adversary) demand component 226, and a limited best case (ally) demand component 228. A bimodal optimization solver 230 operates on the computer model 220 for the hyperparameter worst-case scenario limits represented by the optimism hyperparameters $\lambda$ and K. This bimodal optimization solver 230 may comprise large scale optimization on specialized hardware, and may implement the solution technique according to one or more of the illustrative embodiments described herein, e.g., the Benders solution methodology with one or more of the various variations of the subproblem (e.g., exact or alternating heuristic methods) described herein, for example. Based on the optimization performed by the bimodal optimization solver 230, key performance indicators (KPIs) are generated based on processing a validation dataset 235, and stored in a database 240. These KPIs may be used to tune the optimism hyperparameters $\lambda$ and K. Based on the optimum hyperparameters $\lambda$ and K, the BIO computer tool 200 executes an ally-adversary computer model 220 simulation based on new input data to thereby generate outputs 250 indicative of forecasted demand, KPIs, and recommendations for allocation of resources, e.g., goods/products, to locations within the omnichannel architecture or environment.

Based on the output 250 appropriate personnel may make decisions regarding resource procurement and allocation to various locations to handle worst case scenario demands that are more realistic than previous RO based worst-case scenario based forecasts, while providing for the capture of opportunities to maximum worst-case performance through potential best-case, or ally, demand situations. For example, in some illustrative embodiments, these recommendations may be input to a downstream computing system implementing an ERP system that retailers use commonly for their inventory management. In particular, retailers may execute a buying decision from the supplier and pay the cost of purchase, and in the case of internal re-distribution (say warehouse to store), would load a truck with that inventory. All of this would lead to a change in the physical inventory that shows up (or gets depleted) in the different nodes (stores and warehouses) of the retailer.

The following description will present various formulations for defining the computer model implemented by the ally-adversary bimodal inventory optimization (BIO) computer tool and computer tool operations/functionality in accordance with one or more illustrative embodiments. It should be appreciated that these formulations are only examples, and many modifications may be made to these formulations without departing from the spirit and scope of the present invention. It should also be appreciated that the functionality described with regard to these formulations are intended to be implemented in specific computer logic and executed with computer hardware specifically configured to perform operations for realizing these formulations and the computer model(s), which cannot be practically performed by human beings or as any organization of human activity.

It should also be appreciated that the following discussion will make reference to numerous notations in defining these various formulations. FIG. 3 is provided as a convenient representation of the notations for describing the inventory optimization formulations of an ally-adversary bimodal inventory optimization computing tool and corresponding operations/functionality, that may be viewed while reviewing the following description. Thus, reference is made to FIG. 4 for defining the various notations used hereafter.

To demonstrate the improvements of the illustrative embodiments more easily, first consider a situation in which retailer nodes, stores or warehouses, are represented by a set $\Lambda$. It is assumed that the e-commerce demand comes from various regions denoted by zones Z, such as the zones mentioned previously. The external supplier is denoted by S. As lead time is modeled in the demand and allocation decision problem, any action taken immediately by the retailer has only an impact in downstream periods. Thus, the retailer's demand and allocation decision problem is automatically a multi-period problem. The retailer demand and allocation problem is modeled for T periods, where it is assumed that the T periods include periods when the immediate inventory actions recommended can be executed and the KPIs are realized, i.e., the rewards, costs and profits can be computed. For example, if the lead time is 1 week and the replenishment cycle time is 1 week, the retailer demand and allocation problem will be modeled at least over a 2 week period. Note that even though the modeling of the retailer demand and allocation problem is over all the T periods, the model only executes on the current decision, and then the prediction models are updated based on realized demand in the next period and the optimization model is re-solved to get decisions for the next period, i.e., all decisions are made in a rolling horizon fashion.

The retailer aims to make a decision $$x_u^l, \forall\, l \in S \bigcup \Lambda$$

which represents how much inventory to move from the supplier or first nodes (locations l) in the omnichannel distribution system to other second nodes (locations l') in the network. This decision x is indexed by t to denote all the decisions in each period t. The retailer makes this decision with an input of demand forecast of the different channels, specifically at the time-location-fulfillment channel level. For the purpose of showcasing the models, the illustrative embodiments are described as working with 2 types of fulfillment channels—walk-in demand and online demand shipped to the consumer, as previously discussed above. The walk-in demand at node $l \in \Lambda$ is denoted by $$D_{tl}^b$$

and the online demand is denoted by $$D_{tz}^o$$

for zone $z \in Z$. Note that depending on how the forecasts are modeled, deterministic or uncertain and within an uncertainty set, the notation of these forecasts is modified.

The initial state comprises the current on-hand inventory and that in the pipeline, which is denoted by I(bar). For location l, this is $$I(\text{bar})_l^j$$

where $j=0, \ldots, L_l$, a vector of size $L_l+1$ where $L_l$ is the maximum lead time across all pairs of connected nodes l' to l, and where $l' \in \Lambda \cup S$.

The prices offered in the different channels in the down stream periods are given and are denoted by $$p_{tl}^b$$

for walk-in demand and $$p_t^o$$

for online demand. Note that the walk-in prices may vary by location but e-commerce prices are steady across locations. It is assumed that $$p_{tl}^b > p_t^o - c_{lz} \forall\, i \in \Lambda, z \in Z, t \in T$$

where $c_{lz}$ is the fulfillment cost from node l to any zone z. This essentially means that the price in the walk-in channel is more than the online price minus the shipping cost from that node to any other zone. This means it is always more beneficial to serve a walk-in customer than meeting online demand, thus avoiding stock hedging (hiding inventory in the backroom for a possible online customer rather meeting an existing walk-in customer demand).

The following sequence of events is assumed: the historically ordered inventory in the pipeline arrives and the retailer then places the order, the omni-channel demand is realized, and the retailer fulfills the demand and then rewards and costs are incurred. Note that it is assumed, for the purpose of making purchasing and distribution decisions, that the fulfillment decisions are batched over each period chosen by the retailer. In reality, they are order by order or batched over shorter durations (for example, the latter may be every day or even on-the-fly, while the inventory decisions are weekly, or the like).

With a deterministic formulation, it is assumed that the retailer is given the nominal demands in the different channels, specifically the walk-in demand $$D(\text{bar})_{tl}^b$$

and the online demand $$D(\text{bar})_{tz}^o.$$

Note that these demands can be mean demand or higher order quantiles of the demand distribution. The retailer's optimal purchase and allocation problem, with an initial state inventory I(bar) can be formulated as follows:

$$Z^D(\bar{I}) = \max_{\substack{x \in \mathbb{Z}^+ \\ s,u,y,I \ge 0}} \sum_{t \in \mathcal{T}} \sum_{l \in \Lambda} \left[ p_{tl}^b s_{tl}^b + \sum_{z \in Z} (p_t^o - c_{lz}) y_{tlz} \right] - \qquad (1.1)$$

$$\sum_{t \in \mathcal{T}} \sum_{z \in Z} b_t^o u_{tz}^o - \sum_{t \in \mathcal{T}} \sum_{l \in \Lambda} \left[ b_{tl}^b u_{tl}^b + \sum_{l' \in \Lambda \cup S} C_{l'l} x_{l'l}^t + h_l I_{t+1,l} \right]$$

subject to. $s_{tl}^b + u_{tl}^b = \overline{D}_{tl}^b \quad \forall\, l \in \Lambda,\, t \in \mathcal{T}$ \qquad (1.2)

$$\sum_{l \in \Lambda} y_{tlz} + u_{tz}^o = \overline{D}_{tz}^o \quad \forall\, z \in Z,\, t \in \mathcal{T} \qquad (1.3)$$

$$s_{tl}^b + \sum_{z \in Z} y_{tlz} + I_{t+1,l} = I_{tl} + T_l^{t+1} \mathbb{1}_{t < L_l} + \sum_{l' \in \Lambda \cup S} x_{l'l}^{t - L_{l'l}} \mathbb{1}_{t \ge L_{l'l}} - \sum_{l' \in \Lambda} x_{ll'}^t \qquad (1.4)$$

$$\forall\, l \in \Lambda,\, t \in \mathcal{T}$$

$$I_{0l} = T_l^0 \quad \forall\, l \in \Lambda \qquad (1.5)$$

Here, the objective of the formulation models the total profitability of the retailer from allocation, distribution, and fulfillment. Specifically, the first two terms model the revenue from sales from the walk-in ($p^h s^b$) and online demands ($p^o - c$)y, the next two ($b^o u^o$, $b^o u^b$) model the penalty from lost sales (un-met demand) in the two channels, respectively, the fifth terms (Cx) models the purchase cost from supplier and/or the transportation cost to move inventory from one node to another, and finally the sixth term (hI) models the holding cost on the left over inventory.

The constraints (1.2, 1.3) in the formulation models sales plus lost sales which is less than the channel specific demand in every period and location. The constraint (1.4) models the inventory balance across different periods for each location. In more detail, the third constraint states that the sum of the walk-in sales at a node, the e-commence fulfilled sales from the same node, plus the left over inventory in that node, is equal to: the on-hand inventory plus the inventory in the historical pipeline that arrived in that period in that node, plus the inventory that will arrive based on decisions made in the solution of this problem, less those that are shipped out of the same node. The constraint (1.5) fixes the initial state of inventory. These formulations may be solved using existing mixed-integer programming optimization solvers, such as IBM ILOG CPLEX and Gurobi.

With a static robust formulation, it is assumed that the goal of the retailer is to maximize the worst case total profitability assuming the demand, $$D_{tl}^b \text{ and } D_{tz}^o,$$

is uncertain and comes from a pre-specified polyhedral set that is derived from data. Specifically, the set U is modeled as follows (and more general polyhedral sets can also be chosen):

$$U := \qquad (1.6)$$

$$\left\{ D_t^b, D_t^o \in \mathbb{Z}^+ \forall\, t \in \mathcal{T} \,\middle|\, \begin{array}{ll} \overline{D}_t^{mL} \le D_t^m \le \overline{D}_t^{mU} & \forall\, m \in \{o, b\},\, t \in \mathcal{T} \\ \overline{\overline{D}}_t^{mL} \le e^T D_t^m \le \overline{\overline{D}}_t^{mU} & \forall\, m \in \{o, b\},\, t \in \mathcal{T} \end{array} \right\}$$

The first constraint models that every demand in a location and time period lies in a box set and the second constraint models that across locations for every time period and channel, the total demand lies within a lower and upper bound. The former bounds can be derived based on quantiles of the demand distribution (say $5^{th}$ and $95^{th}$ quantiles). The latter bounds can be derived based on similar quantiles again using a hierarchical forecast, which is often less sparse and more accurate. These second constraints are called the budget constraints as distributions start to concentrate when aggregated over independent random variables due to central limit theorem. This is why demand and consumption scenarios are referred to as the likely set of the demand or consumption scenario. Without a hierarchical forecast, one can also use the location-scale normalized budget constraints, where the mean is subtracted and there is a division by the standard deviation for the demand at every location, and a quantile of the normal distribution is used due to the central-limit theorem again. As can be seen, both approaches are entirely data driven.

The robust model can be formulated as follows where, after the order is placed, an adversary chooses the worst case demand and the retailer then fulfills the demand.

$$Z^R(\bar{I}) = \max_{x \in \mathbb{Z}^+} \min_{D \in U} \max_{s,u,y,I \ge 0} \sum_{t \in \mathcal{J}} \sum_{l \in \Lambda} \left[ p_{tl}^b s_{tl}^b + \sum_{z \in Z} (p_t^o - c_{lz}) y_{tlz} \right] - \qquad (1.7)$$

$$\sum_{t \in \mathcal{J}} \sum_{z \in Z} b_t^o u_{tz}^o - \sum_{t \in \mathcal{J}} \sum_{l \in \Lambda} \left[ b_{tl}^b u_{tl}^b + \sum_{l' \in \Lambda \cup S} C_{l'l} x_{l'l}^t + h_l I_{t+1,l} \right]$$

subject to. $s_{tl}^b + u_{tl}^b = D_{tl}^b \quad \forall\, l \in \Lambda,\, t \in \mathcal{J}$ \qquad (1.8)

$$\sum_{l \in \Lambda} y_{tlz} + u_{tz}^o = D_{tz}^o \quad \forall\, z \in Z,\, t \in \mathcal{J} \qquad (1.9)$$

$$s_{tl}^b + \sum_{z \in Z} y_{tlz} + I_{t+1,l} = I_{tl} + T_l^{t+1} \mathbb{1}_{t < L_l} = \sum_{l' \in \Lambda \cup S} x_{l'l}^{t - L_{l'l}} \mathbb{1}_{t \ge L_{l'l}} - \sum_{l' \in \Lambda} x_{ll'}^t \qquad (1.10)$$

$$\forall\, l \in \Lambda,\, t \in \mathcal{J}$$

$$I_{0l} = T_l^0 \quad \forall\, l \in \Lambda \qquad (1.11)$$

The details of the model are similar to the previous formulation, except that instead of a single maximization optimization problem, this formulation consists of 3 stages (max., min., max.) of optimization—inventory purchase and distribution, followed by the adversarial demand generation, and then the fulfillment. Such multi-stage problems cannot be solved directly by providing them to an existing solver, and hence the illustrative embodiments implement an exact Benders Decomposition method to solve this problem, which uses the optimization solvers.

The problem is formulated to a max-min structure as follows. First, the dual of the innermost maximization problem is taken and the following formulation is obtained, where A(x) is defined as $$A(x) = -\sum_{t \in T} \sum_{l \in \Lambda} \sum_{i' \in \Lambda \cup S} C_{l',l} x_{l',l}^t:$$

$$\max_{x \in \mathbb{Z}^+} A(x) + \min_{D \in U, \alpha, \beta \geq 0, \gamma} \sum_{t \in \mathcal{J}, l \in \Lambda} (\alpha_{tl} - b_{tl}^b) D_{tl}^b + \sum_{t \in \mathcal{J}, z \in Z} (\beta_{tz} - b_t^o) D_{tz}^o + \tag{1.12}$$

$$\sum_{l \in \Lambda} \gamma_{0l} \bar{I}_l^0 + \sum_{t \in \mathcal{J}, l \in \Lambda} \gamma_{tl} \left( \bar{I}_l^{t+1} \mathbb{1}_{t < L_l} + \sum_{i' \in \Lambda \cup S} x_{i'l}^{t-L_{i'l}} \mathbb{1}_{t \geq L_{i'l}} - \sum_{i' \in \Lambda} x_{il'}^t \right)$$

subject to. $\alpha_{tl} + \gamma_{tl} \geq p_{tl}^b + b_{tl}^b \ \forall t \in \mathcal{J}, l \in \Lambda$ \tag{1.13}

$\beta_{tz} + \gamma_{tl} \geq p_t^o + b_t^o - c_{lz} \ \forall t \in \mathcal{J}, l \in \Lambda, z \in Z$ \tag{1.14}

$\gamma_{tl} - \gamma_{t+1,l} \geq -h_l \ \forall t \in \mathcal{J}, l \in \Lambda$ \tag{1.15}

$\gamma_{T,l} = 0$ \tag{1.16}

Here $\alpha$, $\beta$ and $\gamma$ are the duals to the constraints in the primal problem (the innermost fulfillment problem). The inner problem in the above model has bi-linear terms pf in the form $$\alpha_{tl} D_{tl}^b, \ \beta_{tz} D_{tz}^o.$$

Such problems are NP hard. One can adopt an alternating heuristic to solve for the duals, and then the demand, until convergence of the heuristic is reached. Alternatively, one can adopt a more exact approach, as described hereafter. Based on the fact that the uncertainty is discrete, we the bi-linear problem may be linearized exactly using the RLT (relaxation and linearization technique) as follows.

Let $$\text{D(bar)}_{tli}^b \text{ for } i \in I_{tl}^b \text{ and } D(\text{bar})_{tzi}^o \text{ for } i \in I_{tz}^o$$

specifically be the discrete values of the uncertainty that are feasible to the first set of constraints in Eq. (1.1) (i.e., the box constraints). Then, the uncertainty can be equivalently written as follows:

$$D_{tl}^b = \sum_{i \in I_{tl}^b} \bar{D}_{tli}^b w_{tli}^b; D_{tz}^o = \sum_{i \in I_{tz}^o} \bar{D}_{tzi}^o w_{tzi}^o \tag{1.17}$$

$$w_{tli}^b \in \{0,1\}; w_{tzi}^o \in \{0,1\} \tag{1.18}$$

$$w_{tli}^b \in \{0,1\} \ \forall i \in I_{tl}^b; w_{tzi}^o \in \{0,1\} \ \forall i \in I_{tz}^o \tag{1.19}$$

Now suppose $$\alpha_{tli}^* = \alpha_{tl} w_{tli}^b \text{ and } \beta_{tli}^* = \beta_{tl} w_{tli}^o,$$

and suppose also that $$M = \max_{t,l} \{ p_{tl}^b + b_{tl}^b, \ p_t^o + b_t^o - c_{lz} \} + |T + 1| \max_l h_l.$$

It is known that the following set of inequalities are implied:

$$\alpha_{tli}^* \leq M w_{tli}^b; \beta_{tli}^* \leq M w_{tzi}^o \tag{1.20}$$

$$\sum_i \alpha_{tli}^* = \alpha_{tl}; \sum_i \beta_{tli}^* = \beta_{tl} \tag{1.21}$$

Note that this M computation can be made tighter by having a more tailored M by time period and node or zone location. A common M may be used for the sake of exposition. Now, Eqs. (4.2-4.6) may be substituted into the sub-problem and the bi-linear term may be re-written as follows:

$$D_{tl}^b \alpha_{tl} = \sum_{i \in I_{tl}^b}, \ \bar{D}_{tli}^b \alpha_{tli}^*, \ D_{tz}^o \beta_{tz} = \sum_{i \in I_{tz}^o} \bar{D}_{tzi}^o \beta_{tzi}^* \tag{1.22}$$

An equivalent exact linear reformulation of the robust problem may be retrieved as given below:

$$\max_{x \in \mathbb{Z}^+} A(x) + \min_{\substack{\alpha, \alpha^*, \beta, \beta^* \geq 0, \\ \gamma, w \in \{0,1\}}} \sum_{\substack{t \in \mathcal{J}, l \in \Lambda \\ i \in I_{tl}^b}} \bar{D}_{tli}^b (\alpha_{tli}^* - b_{tl}^b w_{tli}^b) + \tag{1.23}$$

$$\sum_{\substack{t \in \mathcal{J}, l \in \Lambda \\ i \in I_{tz}^o}} \bar{D}_{tzi}^o (\beta_{tzi}^* - b_t^o w_{tzi}^o) + \sum_{l \in \Lambda} \gamma_{0l} \bar{I}_l^0 +$$

$$\sum_{t \in \mathcal{J}, l \in \Lambda} \gamma_{tl} \left( \bar{I}_l^{t+1} \mathbb{1}_{t < L_l} + \sum_{i' \in \Lambda \cup S} x_{i'l}^{t-L_{i'l}} \mathbb{1}_{t \geq L_{i'l}} - \sum_{i' \in \Lambda} x_{il'}^t \right)$$

subject to. $\alpha_{tl} + \gamma_{tl} \geq p_{tl}^b + b_{tl}^b \ \forall t \in \mathcal{J}, l \in \Lambda$ \tag{1.24}

$\beta_{tz} + \gamma_{tl} \geq p_t^o + b_t^o - c_{lz} \ \forall t \in \mathcal{J}, l \in \Lambda, z \in Z$ \tag{1.25}

$\gamma_{tl} - \gamma_{t+1,l} \geq -h_l \ \forall t \in \mathcal{J}, l \in \Lambda$ \tag{1.26}

$\gamma_{T,l} = 0 \ \forall l \in \Lambda$ \tag{1.27}

$\alpha_{tli}^* \leq M w_{tli}^b; \beta_{tli}^* \leq M w_{tzi}^o \ \forall t \in \mathcal{J}, l \in \Lambda, z \in Z, i$ \tag{1.28}

$\sum_{i \in I_{tl}^b} \alpha_{tli}^* = \alpha_{tl}; \sum_{i \in I_{tz}^o} \beta_{tzi}^* = \beta_{tz} \ \forall t \in \mathcal{J}, l \in \Lambda, z \in Z$ \tag{1.29}

$\sum_{i \in I_{tl}^b} w_{tli}^b = 1; \sum_{i \in I_{tz}^o} w_{tzi}^o = 1 \ \forall t \in \mathcal{J}, l \in \Lambda, z \in Z$ \tag{1.30}

$\bar{D}_t^{oL} \leq \sum_{z \in Z, i \in I_{tz}^o} \bar{D}_{tzi}^o w_{tzi}^o \leq \bar{D}_t^{oU}$ \tag{1.31}

$\bar{D}_t^{bL} \leq \sum_{l \in \Lambda, i \in I_{tl}^b} \bar{D}_{tli}^b w_{tli}^b \leq \bar{D}_t^{bU}$ \tag{1.32}

Next, a Benders decomposition based method is developed to solve this max-min problem exactly. The inner problem is referred to as the sub-problem and is denoted by SP (x). Note that for ease of notation, the dependence on I(bar), which is the initial state of the system, is dropped. The optimized sub-problem objective (i.e., without the A(x) term in the above problem) is denoted as $$Z^*_{SP(x)}.$$

The master problem is denoted as $MP_k = MP(\{D^1, \ldots, D^k\})$ and it is formulated as follows, whose optimal objective is denoted by $$Z^*_{MP_k}:$$

$$\max_{\substack{\eta, x \in \mathbb{Z}^+ \\ s,u,y,l \geq 0}} \eta - \sum_{t \in \mathcal{J}} \sum_{l \in \Lambda} \sum_{l' \in \Lambda \cup S} C_{l'l} x^t_{l'l} \quad (1.33)$$

$$\text{subject to} \quad (1.34)$$

$$\eta \leq \sum_{t \in \mathcal{J}, l \in \Lambda} \left[ p^b_{tl} s^{bj}_{tl} + \sum_{z \in Z} (p^o_t - c_{lz}) y^j_{tlz} - b^b_{tl} u^{bj}_{tl} - h_l I^j_{t+1,l} \right] - \quad (1.35)$$

$$\sum_{t \in \mathcal{J}} \sum_{z \in Z} b^o_t u^{oj}_{tz} \quad \forall \, j < k$$

$$s^{bj}_{tl} + u^{bj}_{tl} = D^{bj}_{tl} \quad \forall \, l \in \Lambda, t \in \mathcal{J}, j < k \quad (1.36)$$

$$\sum_{l \in \Lambda} y^j_{tlz} + u^{oj}_{tz} = D^{oj}_{tz} \quad \forall \, z \in Z, t \in \mathcal{J}, j < k \quad (1.37)$$

$$s^{bj}_{tl} + \sum_{z \in Z} y^j_{tlz} + I^j_{t+1,l} = I^j_{tl} + T^{t+1,j}_l \mathbb{1}_{t < L_l} + \sum_{l' \in \Lambda \cup S} x^{t-L_{l'l}}_{l'l} \mathbb{1}_{t \geq L_{l'l}} - \sum_{l' \in \Lambda} x^t_{ll'} \quad (1.38)$$

$$\forall \, l \in \Lambda, t \in \mathcal{J}, j < k$$

$$I^j_{0l} = T^0_l \quad \forall \, l \in \Lambda, j < k \quad (1.39)$$

Figure 6:
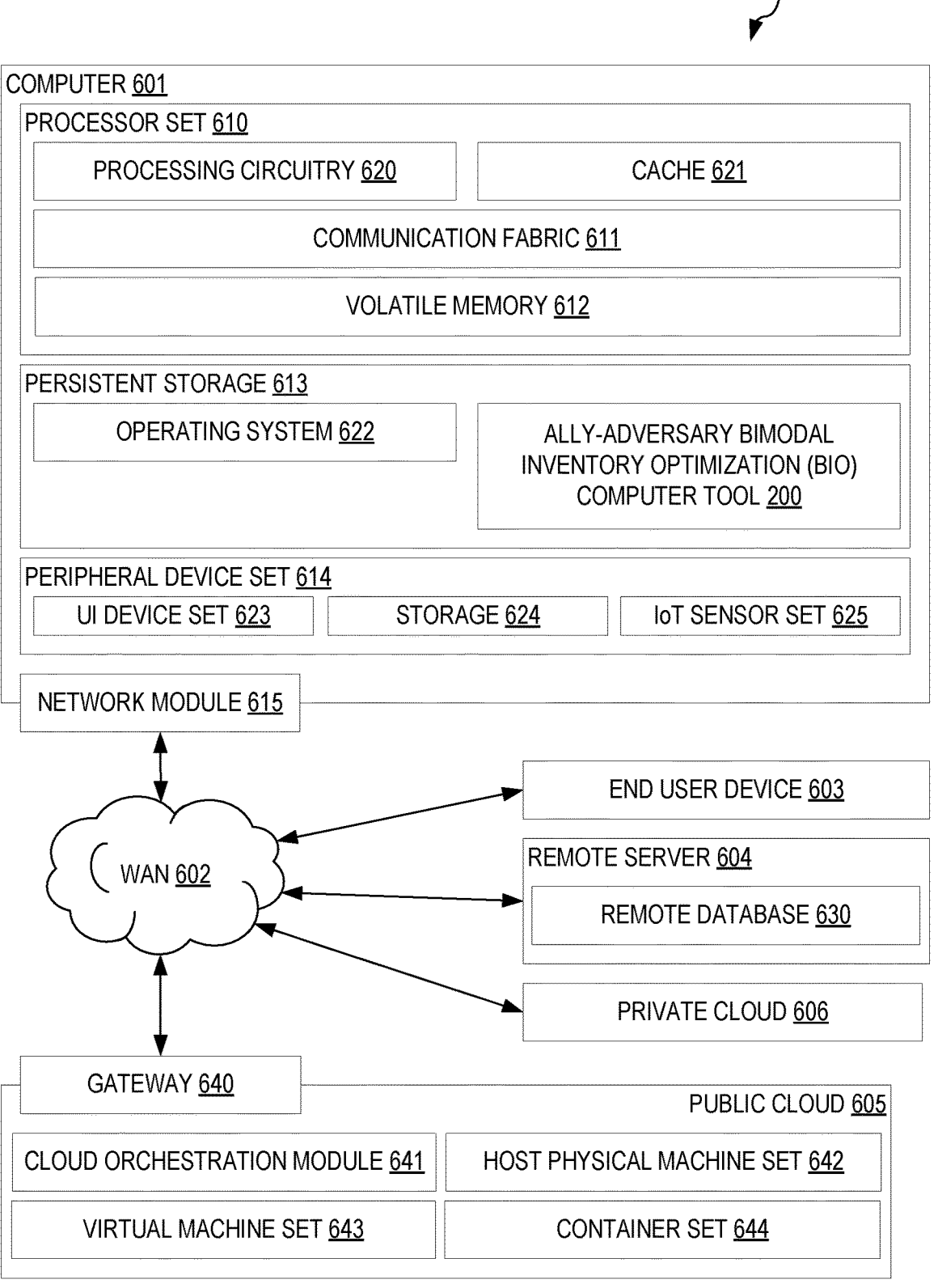
FIG. 6 is an example diagram of a distributed data processing system environment in which aspects of the illustrative embodiments may be implemented and at least some of the computer code involved in performing the inventive methods may be executed.

The Benders Decomposition algorithm is given in Algorithm 1 shown in FIG. 6, which solves the master and the sub-problem alternatively until a specified tolerance based stopping criteria is achieved. Other practical stopping criteria based on number of iterations and time-taken can also be adopted. In this solution technique, the master program generates a sequence of beneficial allocations and the sub-problem adds a corresponding adversarial demand "cut" to the master problem, and the iterations stop when the two problems converge in their achieved objectives.

As discussed previously, the behavior of pure robust adversaries is to select skewed worst-case demands that do not align with inventory, which is of little value as this results in no revenue and increases costs, and thus, allocations that cannot result in conditional skewed demands are recommended. These are essentially a uniform distribution of inventory across locations. Moreover, the two key issues with robust optimization based inventory optimization, as discussed above, i.e., skewed initial inventory state causing adversarial demands to be rare events and causing worst-case demand based allocations to result in reduced performance, and the quest for robustness being overly focused on protecting downside and ignoring potential upside, result in robust optimization methods protecting against cost spikes but not being able to exploit sales opportunities. Allocation decisions must be able to boost sales while also keeping costs down.

One way to also motivate the reason to consider allied demands, as in the illustrative embodiments, is also the total lost demand across locations for every time period, which is $$\sum_{l \in \Lambda} \left( D^b_{tl} - I_l \right)^+,$$

is also governed by the central limit theorem. This is currently not modeled in the robust optimization problem. In other words, as the inventory goes up, one would prefer to see the sales steadily going up, but with robust models, this trend is not observed by the worst case demand with the trend being far more abrupt and discrete. One aspect to note here is that, in the omni-channel environment, this adversarial behavior impacts the walk-in channel far more than it impacts the online channel because regardless of bad positioning of inventory, the online demand can be fulfilled because of ship-from-store fulfillment, while that is not the case for walk-in demand.

In the following discussion, $D^+ \in U$ is referred to as the demand scenario that is allied, in that the demand is aligned with the inventory positions. Because of the lop-sided impact on the channels, and as an example, the following illustrative embodiments assume allied walk-in demands only, although the same concepts and mechanisms may be extended, as needed, to online demands and the like. The final demand is a superposition of this allied demand D+ and the prior adversarial (worst-case) demand D. The canonical allied demand formulation is described herein below.

Let $\lambda_t$ be the fraction of the walk-in demand budget that is to be optimistic in each period. This is specified as a hyperparameter in the following formulation:

$$(1.40)$$

$$Z^{BIO}(I) =$$

$$\max_{\substack{x \in \mathbb{Z}^+, D^+ \in U, \\ s^+, u^+ \geq 0}} \min_{D^- \in U} \max_{\substack{s^-, u^- \geq 0, \\ y, t \geq 0}} \sum_{t \in \mathcal{J}} \sum_{l \in \Lambda} \left[ p^b_{tl} \left( s^{b+}_{tl} + s^{b-}_{tl} \right) + \sum_{z \in Z} (p^o_t - c_{lz}) y_{tlz} \right] -$$

$$\sum_{t \in \mathcal{J}} \sum_{z \in Z} b^o_t u^o_{tz} - \sum_{t \in \mathcal{J}} \sum_{l \in \Lambda} \left[ b^b_{tl} \left( u^{b+}_{tl} + u^{b-}_{tl} \right) + \sum_{l' \in \Lambda \cup S} C_{l'l} x^t_{l'l} + h_l I_{t+1,l} \right]$$

$$\text{subject to. } s^{b+}_{tl} + u^{b+}_{tl} = \lambda_t D^{b+}_{tl} \quad \forall \, l \in \Lambda, t \in \mathcal{J} \quad (1.41)$$

$$s^{b-}_{tl} + u^{b-}_{tl} = (1 - \lambda_t) D^{b-}_{tl} \quad \forall \, l \in \Lambda, t \in \mathcal{J} \quad (1.42)$$

$$\sum_{l \in \Lambda} y_{tlz} + u^o_{tz} = D^o_{tz} \quad \forall \, z \in Z, t \in \mathcal{J} \quad (1.43)$$

$$s^{b+}_{tl} + s^b_{tl} + \sum_{z \in Z} y_{tlz} + I_{t+1,l} = \quad (1.44)$$

$$I_{tl} + T^{t+1}_l \mathbb{1}_{t < L_l} + \sum_{l' \in \Lambda \cup S} x^{t-L_{l'l}}_{l'l} \mathbb{1}_{t \geq L_{l'l}} - \sum_{l' \in \Lambda} x^t_{ll'}$$

$$\forall \, l \in \Lambda, t \in \mathcal{J}$$

$$I_{0l} = T^0_l \quad \forall \, l \in \Lambda \quad (1.45)$$

Compared to the RO model discussed above, the BIO model has separate sales constraints for the optimistic (ally) and pessimistic (adversary) portions of the demand vector and the resulting optimistic sales, pessimistic sales, and lost sales terms in the objective function.

A key difference from the prior RO approach is that the allied demand decisions are made at the time of allocation to maximize profitability. That is, looking at the RO model discussed previously, allocation is made and then a pessimistic decision based on worst case forecasting is performed. In the BIO computer model simulation of the illustrative embodiments, the allocation and decisions are made jointly. Note that the allied demand is only a fraction that is controlled by $\lambda$. The objective function of the model will increase as the $\lambda$ increases, i.e., more of the demand is allied. However, the out-of-sample performance, i.e., the performance on a validation data set or in the real-world, may start deteriorating. The balancing of optimistic $D^+$ and pessimistic $D^-$ scenarios allows the solution to improve the average case performance, where the best $\lambda$ is a hyperparameter that is chosen based on out-of-sample performance. These models protect against worst case shocks while also placing smart inventory bets on potential sales opportunities, but should be appreciated to be generally applicable to any resource allocation omnichannel architecture/environment and are not limited to the sale of goods/products in an omnichannel architecture or environment.

Various methodologies may be used to solve the allied demand problem formulated above, an example of which is the Benders Decomposition methodology, as mentioned above, which is now applied to the optimistic (ally) component of the ally-adversary BIO computer model simulation. The master problem, or model, of the Benders Decomposition methodology applied to an ally component of an ally-adversary BIO computer model simulation may be as follows:

$$\max_{\substack{\eta, x \in \mathbb{Z}^+, D^+ \\ s,u,y,I \geq 0}} \eta + \sum_{t \in \mathcal{J}} \sum_{l \in \Lambda} p_{tl}^b s_{tl}^{b+} - b_{tl}^b u_{tl}^{b+} - \sum_{t \in \mathcal{J}} \sum_{l \in \Lambda} \sum_{l' \in \Lambda \cup S} C_{l'l} x_{l'l}^t \qquad (1.46)$$

subject to $\qquad\qquad (1.47)$ $$\eta \leq \sum_{t \in \mathcal{J}, l \in \Lambda} \left[ p_{tl}^b s_{tl}^{bj-} + \sum_{z \in Z} (p_t^o - c_{lz}) y_{tlz}^j - b_{tl}^b u_{tl}^{bj-} - h_l I_{t+1,j}^j \right] - \qquad (1.48)$$

$$\sum_{t \in \mathcal{J}, z \in Z} b_t^o u_{tz}^{oj} \ \forall \ j < k$$

$$s_{tl}^{b+} + u_{tl}^{b+} = \lambda_t D_{tl}^{b+} \ \ \forall \ l \in \Lambda, t \in \mathcal{J} \qquad (1.49)$$

$$s_{tl}^{bj-} + u_{tl}^{bj-} = (1 - \lambda_t) D_{tl}^{bj-} \ \ \forall \ l \in \Lambda, t \in \mathcal{J}, j < k \qquad (1.50)$$

$$\sum_{l \in \Lambda} y_{tlz}^j + u_{tz}^{oj} = D_{tz}^{oj} \ \ \forall \ z \in Z, t \in \mathcal{J}, j < k \qquad (1.51)$$

$$s_{tl}^{b+} + s_{tl}^{bj-} + \sum_{z \in Z} y_{tlz}^j + I_{t+1,l}^j = \qquad (1.52)$$

$$I_{tl}^j + T_l^{t+1,j} \mathbb{1}_{t < L_l} + \sum_{l' \in \Lambda \cup S} x_{l'l}^{t-L_{l'l}} \mathbb{1}_{t \geq L_{l'l}} - \sum_{l' \in \Lambda} x_{ll'}^t$$

$$\forall \ l \in \Lambda, t \in \mathcal{J}, j < k$$

$$I_{0l}^j = T_l^0 \ \ \forall \ l \in \Lambda, j < k \qquad (1.53)$$

It should be noted that in this implementation of the Benders Decomposition methodology, in addition to passing the allocation variable x to the sub-problem, the sales variable $$s_{tl}^{b+}$$

is also passed to the sub-problem. The sub-problem constraints remain the same as discussed previously, but the objective is modified as follows following duality theory:

$$\min_{\substack{\alpha, \alpha^*, \beta, \beta^* \geq 0, \\ \gamma, w \in 0,1}} \sum_{\substack{t \in \mathcal{J}, l \in \Lambda \\ i \in I_t^{lb}}} (1 - \lambda_t) \overline{D}_{tli}^b (\alpha_{tli}^* - b_{tl}^b w_{tli}^b) + \sum_{\substack{t \in \mathcal{J}, z \in Z \\ i \in I_t z^o}} \overline{D}_{tzi}^o (\beta_{tzi}^* - b_t^o w_{tzi}^o) + \qquad (1.54)$$

$$\sum_{l \in \Lambda} \gamma_{0l} T_l^0 + \sum_{t \in \mathcal{J}, l \in \Lambda} \gamma_{tl} \left( T_l^{t+1} \mathbb{1}_{t < L_l} + \sum_{l' \in \Lambda \cup S} x_{l'l}^{t-L_{l'l}} \mathbb{1}_{t \geq L_{l'l}} - \sum_{l' \in \Lambda} x_{ll'}^t - s_{tl}^{b+} \right)$$

In some illustrative embodiments the set of K locations may be fixed where optimism is introduced. Here, in the master problem, it suffices to introduce a variable $z_l$ for every location which is 1 if the location is an optimistic location and 0 otherwise, and introduce the following additional constraints:

$$\sum_{l \in \Lambda} z_l \leq K; D_{tl}^{b+} \leq z_l D_{max} \ \ \forall \ l \in \Lambda, t \in \mathcal{J}; z_l \in \{0,1\} \qquad (1.55)$$

The first constrain fixes the number of optimistic locations to K and the second equation sets the optimistic demand to 0 if the location is not optimistic.

In some illustrative embodiments, every location may be forced to be only optimistic or only adversarial. This may be accomplished by changing the constant $\lambda_t$ to a variable $\lambda_{tl}$, where $$\lambda_{tl} D_{tl}^{b+}$$

is linearized via RLT constraints assuming $$D_{tl}^{b+}$$

is discrete, and a new continuous variable $$\lambda_{tli}^w$$

is introduced which is positive if $$w_{tl}^b$$

is 1 and 0 otherwise. Note that these $$w_{tl}^b$$

were introduced into the sub-problem and are set to 1 if the discreate demand is chosen, and 0 otherwise.

$$\sum_{l \in \Lambda, i} \lambda_{tli}^w \leq K; \lambda_{tl} D_{tl}^{b+} = \sum_i \lambda_{tli}^w \overline{D}_{tli}^{b+}; \lambda_{tli}^w \leq \lambda_{tli}^b \qquad (1.56)$$

$$\forall \ l \in \Lambda, t \in \mathcal{J}$$

This allows for varying the sub-problem demand only within the master problem. Note that here, the net demand scenario may violate the budget constraints as the super-position constant is dependent on location l. Thus, one can additionally add budget constraints over the resultant sce-nario as follows:

$$\overline{D}_t^{bL} \leq \lambda_{tl} D_{tl}^{b+} + (1 - \lambda_{tl}) D_{tl}^{b-} \leq \overline{D}_t^{bU} \tag{1.57}$$

In some illustrative embodiments, a lost demand budget constraint is added using training data as follows within the sub-problem constraining the uncertainty set. The solution method remains the same as the pure robust method barring the addition of the following constraints to the subproblem:

$$\sum_{i \in \Lambda} \left[ \sum_{t \leq \tau} D_{tl}^b - T_{0l} + \sum_{t \leq \tau} \left( T_l^{t+1} \mathbb{1}_{t < L_l} + \sum_{l' \in \Lambda \cup S} x_{l'l}^{t-L_{l'}l} \mathbb{1}_{t \geq L_{l'}l} - \sum_{l' \in \Lambda} x_{ll'}^t \right) \right]^+ \leq \tag{1.58}$$

$$budget_l$$

Note that, in the Benders sub-problem all the allocation variable, x, are an input and so using training data, one can evaluate the distribution of the left-hand-side (LHS) of the above relationship and obtain a certain quantile of the distribution as an upper bound. Note that this approach, is more data-driven in characterizing the optimism, unlike other methods. Also, note that in every iteration these constraints change and hence, the budget also changes due to changes of x. Thus, these constraints have to be recalcu-lated each iteration and added back with the correct budget, as the budget is conditional on the allocation x which changes from iteration to iteration. These constraints are not linear, but are linearized by creating a non-negative variable $z_{tl} \geq 0$ and greater than the LHS without the positive part, i.e., $$z_{tl} \geq \left[ \sum_{t \leq \tau} D_{tl}^b - T_{0l} + \sum_{t \leq \tau} \left( T_l^{t+1} \mathbb{1}_{t \leq L_l} + \sum_{l' \in \Lambda \cup S} x_{l'l}^{t-L_{l'}l} \mathbb{1}_{t \geq L_{l'}l} - \sum_{l' \in \Lambda} x_{ll'}^t \right) \right],$$

as another constraint in the problem.

As described in detail above, there are various illustrative embodiments for implementing the solution to this two-stage RO formulation, where the two stages correspond to the adversarial component and ally component. In some illustrative embodiments, allocations and a subset of best case demand locations and their demands are jointly deter-mined. In some illustrative embodiments, allocations and their corresponding allied demand lower bounds within a budge are computed, where these lower bounds represent a lower bound to the worst-case demand, i.e., the adversarial component. In some illustrative embodiments, a simulation optimization is utilized to derive a central limit theorem based dynamic lost sales or sell through constraint, or its normalized alternative. The data driven hyperparameter con-trols the degree of K of "optimism vs. adversity" in the demand scenarios.

Thus, the illustrative embodiments provide a robust opti-mization computer model simulation of resource allocation in an omnichannel architecture or environment that takes into account worst-case scenario planning along with opti-mistic "smart bet" limitations on the worst-case (adversarial) scenario by providing an ally-adversary bimodal inventory optimization (BIO) computer tool and computer tool opera-tions/functionality. The operation of the BIO computer tool simulates this optimistic worst-case scenario to generate key performance indicators (KPIs) and recommendations regarding resource provisioning, resource allocation to loca-tions, and the like. Thus, the recommendations not only account for realistic worst-case scenario situations, but also take advantage of opportunities for increasing the benefit of optimum allocation of resources, e.g., sales opportunities in the case of the sale of goods/products.

As described above, the illustrative embodiments of the present invention are specifically directed to an improved computing tool that provides an ally-adversary bimodal inventory optimization (BIO) computer model and simula-tion mechanisms for driving decision making with regard to resource allocation. All of the functions of the illustrative embodiments as described herein are intended to be per-formed using automated processes without human interven-tion. While a human being may make use of the output generated by the illustrative embodiments, the illustrative embodiments of the present invention are not directed to actions performed by the human being, but rather the logic and functions performed specifically by the improved com-puting tool to provide insights for decision making, specifi-cally with regard to resource allocation within an omnichan-nel architecture or environment. Thus, the illustrative embodiments are directed to any mental activity or organiz-ing any human activity, but are in fact directed to the automated logic and functionality of an improved computing tool.

Figure 5:
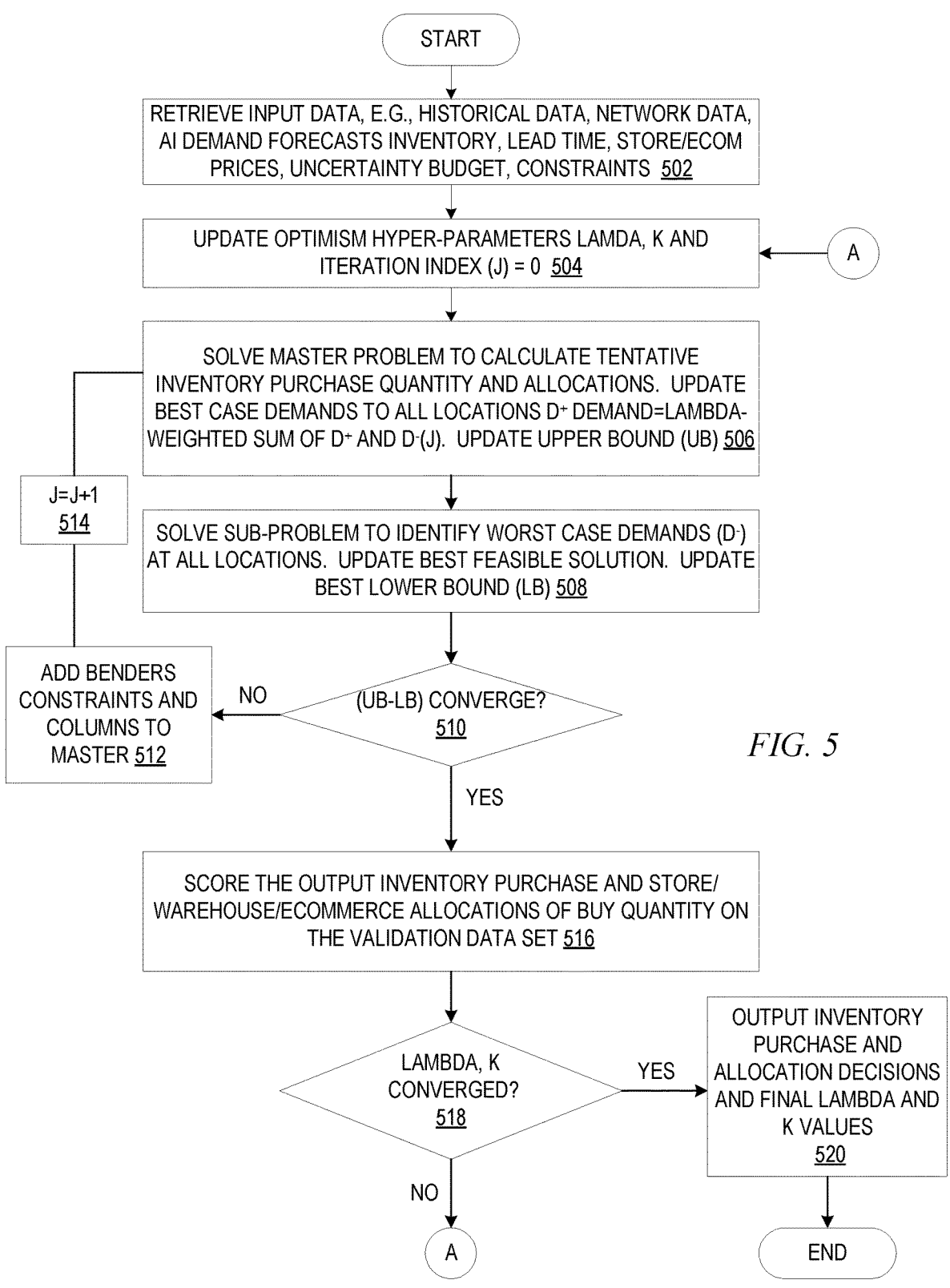
FIG. 5 is a flowchart outlining an example operation for omnichannel resource allocation based on an ally-adversary bimodal inventory optimization (BIO) computer model of a BIO computer tool in accordance with one illustrative embodiment.

FIG. 5 presents a flowchart outlining example operations of elements of the present invention with regard to one or more illustrative embodiments. It should be appreciated that the operations outlined in FIG. 5 are specifically performed automatically by an improved computer tool of the illustra-tive embodiments and are not intended to be, and cannot practically be, performed by human beings either as mental processes or by organizing human activity. To the contrary, while human beings may, in some cases, initiate the perfor-mance of the operations set forth in FIG. 5, and may, in some cases, make use of the results generated as a consequence of the operations set forth in FIG. 5, the operations in FIG. 5 themselves are specifically performed by the improved computing tool in an automated manner.

FIG. 5 is a flowchart outlining an example operation for omnichannel resource allocation based on an ally-adversary bimodal inventory optimization (BIO) computer model of a BIO computer tool in accordance with one illustrative embodiment. The process outlined in FIG. 5 may be per-formed, for example, by a BIO computer model and BIO computer tool, such as 200 in FIG. 2, which may in turn be part of an allocation system, such as the allocation system 140 of a product allocation server 116 in FIG. 1. The process shown in FIG. 5 is illustrated as a collection of blocks in logical flowcharts, which represents a sequence of opera-tions that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or performed in parallel to implement the process.

Referring to FIG. 5, the operation starts by retrieving various input data, such as from the data stores 114 associated with the allocation system 140 of the allocation server 116 (step 502). The input data may comprise setup data of the omnichannel distribution network, artificial intelligence demand forecasts for a product, initial inventory data, lead time data, store/ecommerce pricing data, uncertainty budget, and other constraints. The optimism hyperparameters of the ally-adversary bimodal inventory optimization (BIO) computer model are updated and the iteration is set to an initial value, e.g., 0 (step 504). It should be appreciated that the hyperparameters may comprise the value $\lambda$ and K, as discussed above, and initially the values of these hyperparameters may be set by a user input.

In step 506, the master problem of the Benders Decomposition solution of the BIO computer model may be solved to calculate a tentative inventory purchase quantity and allocations. The best case demands to all locations $D^+$ are updated, where the demand is equal to $\lambda$ less the weighted sum of $D^+$ and $D^-(j)$. The upper bound on the optimal objective function value is updated. For example, in one embodiment, this is obtained by solving optimization problem in equations (1.46-1.53).

In step 508, the subproblem is solved to identify worst case demands $(D^-)$ at all locations. The best feasible solution is updated and the best lower bound on the optimal objective function value is updated. In one embodiment, this is obtained by solving model in equations (1.54) which is the objective function together with constraints (1.24-1.32).

A determination is made as to whether the upper bound and lower bound have converged (e.g., their values are within 1% or 5% of each other) (step 510). If the upper bound and lower bound have not converged, then Benders constraints and columns are added to the master problem (step 512). Thereafter, the iteration is incremented, j=j+1, and the operation returns to step 506 to perform a next iteration until the upper bound and lower bound converge. Alternative termination criteria such as a time-limit, number of maximum iterations with a minimum iteration requirement, and the like, can also be applied.

Once the upper bound and lower bound converge (step 510), the output inventory purchase and store/warehouse/ ecommerce allocations of buy quantity are scored on the validation data set (step 516). The validation data set consists of scenarios (demand, price, initial inventory states) previously not "seen" by any of the aforementioned models, i.e., it was not used to train or calibrate the forecasts nor obtain the BIO computer tool outputs. Such a validation dataset is an "out of sample" dataset that consists of all the required input data elements (including all network, prices, demands and initial inventory positions at all locations) in order to calculate the KPIs and objective function value for any BIO-generated inventory procurement and inventory allocation decision.

A determination is made as to whether the values of the hyperparameters $\lambda$ and K have converged, e.g., whether corresponding KPIs and/or achieved objective function values across successive iterations have changed only by a small value, such as 1% of 5%, for example (step 518). If the hyperparameters have not converged, the operation returns to step 504 where these hyperparameters are updated and the process is repeated. In some illustrative embodiments, for example, these hyperparameters may be updated by starting from a pure RO setting for these hyperparameters, where optimism level is zero, and gradually increase their values by preset increments (e.g., 10%).

If the hyperparameters have converged, then the inventory purchase and allocation decisions are output and the final hyperparameter values are also output (step 520). By converged, what is meant is that the maximum profitability gain has be achieved or is in the vicinity of the optimal (note that on the validation dataset, it was noted to be an inverted U shaped curve and in the vicinity of the optimal objective can be gathered). Note that for any new hyperparameter value, the inventory purchase and allocation decisions are feasible to all constraints. This property allows the method to retain information from the previous hyperparameters and "warm start" the next iteration, resulting in much shorter run times in practice. The operation then terminates.

The present invention may be a specifically configured computing system, configured with hardware and/or software that is itself specifically configured to implement the particular mechanisms and functionality described herein, a method implemented by the specifically configured computing system, and/or a computer program product comprising software logic that is loaded into a computing system to specifically configure the computing system to implement the mechanisms and functionality described herein. Whether recited as a system, method, of computer program product, it should be appreciated that the illustrative embodiments described herein are specifically directed to an improved computing tool and the methodology implemented by this improved computing tool. In particular, the improved computing tool of the illustrative embodiments specifically provides an ally-adversary bimodal inventory optimization (BIO) computer model that operates to simulate demand and resource allocation for an adversarial (worst-case) scenario while taking into account a possibility for optimistic (ally) demand representing potential sales opportunities or other resource allocation benefits. The improved computing tool implements mechanism and functionality, such as the BIO computer tool 200 in FIG. 2, which cannot be practically performed by human beings either outside of, or with the assistance of, a technical environment, such as a mental process or the like. The improved computing tool provides a practical application of the methodology at least in that the improved computing tool is able to provide insights for decision making with regard to resource allocation based on forecasting demand and resource availability at various locations of an omnichannel architecture/environment to plan and prepare for worst-case scenarios that are more realistic due to the inclusion of an ally component that represents potential best-case scenarios, thereby limiting the worst-case scenario from being overly pessimistic.

FIG. 6 is an example diagram of a distributed data processing system environment in which aspects of the illustrative embodiments may be implemented and at least some of the computer code involved in performing the inventive methods may be executed. That is, computing environment 600 contains an example of an environment for the execution of at least some of the computer code involved in performing the inventive methods, such as the ally-adversary bimodal inventory optimization (BIO) computer tool 200 and corresponding operations/functionality. In addition to block 200, computing environment 600 includes, for example, computer 601, wide area network (WAN) 602, end user device (EUD) 603, remote server 604, public cloud 605, and private cloud 606. In this embodiment, computer 601 includes processor set 610 (including processing circuitry 620 and cache 621), communication fabric 611, volatile memory 612, persistent storage 613 (including operating system 622 and block 200, as identified above), peripheral device set 614 (including user interface (UI), device set 623, storage 624, and Internet of Things (IoT) sensor set 625), and network module 615. Remote server 604 includes remote database 630. Public cloud 605 includes gateway 640, cloud orchestration module 641, host physical machine set 642, virtual machine set 643, and container set 644.

Computer 601 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 630. As is well understood in the art of computer technology, and depending upon the technology, performance of a computer-implemented method may be distributed among multiple computers and/or between multiple locations. On the other hand, in this presentation of computing environment 600, detailed discussion is focused on a single computer, specifically computer 601, to keep the presentation as simple as possible. Computer 601 may be located in a cloud, even though it is not shown in a cloud in FIG. 6. On the other hand, computer 601 is not required to be in a cloud except to any extent as may be affirmatively indicated.

Processor set 610 includes one, or more, computer processors of any type now known or to be developed in the future. Processing circuitry 620 may be distributed over multiple packages, for example, multiple, coordinated integrated circuit chips. Processing circuitry 620 may implement multiple processor threads and/or multiple processor cores. Cache 621 is memory that is located in the processor chip package(s) and is typically used for data or code that should be available for rapid access by the threads or cores running on processor set 610. Cache memories are typically organized into multiple levels depending upon relative proximity to the processing circuitry. Alternatively, some, or all, of the cache for the processor set may be located "off chip." In some computing environments, processor set 610 may be designed for working with qubits and performing quantum computing.

Computer readable program instructions are typically loaded onto computer 601 to cause a series of operational steps to be performed by processor set 610 of computer 601 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 621 and the other storage media discussed below. The program instructions, and associated data, are accessed by processor set 610 to control and direct performance of the inventive methods. In computing environment 600, at least some of the instructions for performing the inventive methods may be stored in block 200 in persistent storage 613.

Communication fabric 611 is the signal conduction paths that allow the various components of computer 601 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 612 is any type of volatile memory now known or to be developed in the future. Examples include dynamic type random access memory (RAM) or static type RAM. Typically, the volatile memory is characterized by random access, but this is not required unless affirmatively indicated. In computer 601, the volatile memory 612 is located in a single package and is internal to computer 601, but, alternatively or additionally, the volatile memory may be distributed over multiple packages and/or located externally with respect to computer 601.

Persistent storage 613 is any form of non-volatile storage for computers that is now known or to be developed in the future. The non-volatility of this storage means that the stored data is maintained regardless of whether power is being supplied to computer 601 and/or directly to persistent storage 613. Persistent storage 613 may be a read only memory (ROM), but typically at least a portion of the persistent storage allows writing of data, deletion of data and re-writing of data. Some familiar forms of persistent storage include magnetic disks and solid state storage devices. Operating system 622 may take several forms, such as various known proprietary operating systems or open source Portable Operating System Interface type operating systems that employ a kernel. The code included in block 200 typically includes at least some of the computer code involved in performing the inventive methods.

Peripheral device set 614 includes the set of peripheral devices of computer 601. Data communication connections between the peripheral devices and the other components of computer 601 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 623 may include components such as a display screen, speaker, microphone, wearable devices (such as goggles and smart watches), keyboard, mouse, printer, touchpad, game controllers, and haptic devices. Storage 624 is external storage, such as an external hard drive, or insertable storage, such as an SD card. Storage 624 may be persistent and/or volatile. In some embodiments, storage 624 may take the form of a quantum computing storage device for storing data in the form of qubits. In embodiments where computer 601 is required to have a large amount of storage (for example, where computer 601 locally stores and manages a large database) then this storage may be provided by peripheral storage devices designed for storing very large amounts of data, such as a storage area network (SAN) that is shared by multiple, geographically distributed computers. IoT sensor set 625 is made up of sensors that can be used in Internet of Things applications. For example, one sensor may be a thermometer and another sensor may be a motion detector.

Network module 615 is the collection of computer software, hardware, and firmware that allows computer 601 to communicate with other computers through WAN 602. Network module 615 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 615 are performed on the same physical hardware device. In other embodiments (for example, embodiments that utilize software-defined networking (SDN)), the control functions and the forwarding functions of network module 615 are performed on physically separate devices, such that the control functions manage several different network hardware devices. Computer readable program instructions for performing the inventive methods can typically be downloaded to computer 601 from an external computer or external storage device through a network adapter card or network interface included in network module 615.

WAN 602 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 603 is any computer system that is used and controlled by an end user (for example, a customer of an enterprise that operates computer 601), and may take any of the forms discussed above in connection with computer 601. EUD 603 typically receives helpful and useful data from the operations of computer 601. For example, in a hypothetical case where computer 601 is designed to provide a recommendation to an end user, this recommendation would typically be communicated from network module 615 of computer 601 through WAN 602 to EUD 603. In this way, EUD 603 can display, or otherwise present, the recommendation to an end user. In some embodiments, EUD 603 may be a client device, such as thin client, heavy client, mainframe computer, desktop computer and so on.

Remote server 604 is any computer system that serves at least some data and/or functionality to computer 601. Remote server 604 may be controlled and used by the same entity that operates computer 601. Remote server 604 represents the machine(s) that collect and store helpful and useful data for use by other computers, such as computer 601. For example, in a hypothetical case where computer 601 is designed and programmed to provide a recommendation based on data, then this data may be provided to computer 601 from remote database 630 of remote server 604.

Public cloud 605 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 605 is performed by the computer hardware and/or software of cloud orchestration module 641. The computing resources provided by public cloud 605 are typically implemented by virtual computing environments that run on various computers making up the computers of host physical machine set 642, which is the universe of physical computers in and/or available to public cloud 605. The virtual computing environments (VCEs) typically take the form of virtual machines from virtual machine set 643 and/or containers from container set 644. It is understood that these VCEs may be stored as images and may be transferred among and between the various physical machine hosts, either as images or after instantiation of the VCE. Cloud orchestration module 641 manages the transfer and storage of images, deploys new instantiations of VCEs and manages active instantiations of VCE deployments. Gateway 640 is the collection of computer software, hardware, and firmware that allows public cloud 605 to communicate through WAN 602.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 606 is similar to public cloud 605, except that the computing resources are only available for use by a single enterprise. While private cloud 606 is depicted as being in communication with WAN 602, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 605 and private cloud 606 are both part of a larger hybrid cloud.

As shown in FIG. 6, one or more of the computing devices, e.g., computer 601 or remote server 604, may be specifically configured to implement an ally-adversary bimodal inventory optimization computer tool 200 and corresponding operations/functionality. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as computing device 601 or remote server 604, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described herein in accordance with one or more illustrative embodiments, the implementation of the mechanisms of the illustrative embodiments improves the functionality of the computing device and provides a useful and concrete result that leverages artificial intelligence based hierarchical forecasting of demands for resource availability in omnichannel architectures/environments that plans for worst-case scenarios while taking into consideration possible best-case scenario opportunities.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for generating a resource allocation recommendation in an omnichannel distribution network having a plurality of locations and channels for moving resources between locations, the method comprising:

retrieving historical and current inventory data related to a target resource and the omnichannel distribution network;

generating, using a machine learning model, a hierarchical demand forecast data, for allocation of resources within the omnichannel distribution network, based at least in part on the historical and current inventory data, wherein the hierarchical demand forecast data comprises online demand computed over a zone comprising a geographic cluster;

instantiating an ally-adversary bimodal inventory optimization (BIO) computer model comprising an adversary component that simulates, through a first computer simulation, a worst-case scenario of resource demand and resource availability, and an ally component that limits the adversary component based on a second computer simulation of a limited best-case scenario of resource demand and resource availability, wherein the BIO computer model is instantiated within a virtual computing environment comprising a plurality of virtual machines and container sets;

executing, by the data processing system, the first computer simulation and the second computer simulation of the BIO computer model based on the hierarchical demand forecast data and current inventory data as input to the BIO computer model, to generate a predicted consumption for the target resource across a plurality of locations in the omnichannel distribution network, wherein the plurality of locations within the omnichannel distribution network comprises one or more of warehouses, retail stores, or electronic commerce fulfillment centers, and wherein executing the first computer simulation and the second computer simulation comprises performing, by the data processing system, one or more iterations associated with an objective function, wherein each iteration comprises:

updating a first bound of the objective function based on the limited best-case scenario; and updating a second bound of the objective function based on the worst-case scenario;

generating the resource allocation recommendation for allocating the resource to locations of the omnichannel distribution network, based on the predicted consumption for the target resource;

outputting the resource allocation recommendation to a downstream computing system to perform a downstream computing operation based on the resource allocation recommendation, wherein the downstream computing system is an enterprise resource planning (ERP) system for inventory management; and performing a redistribution of physical inventory at one or more nodes of the omnichannel distribution network based at least in part on the resource allocation recommendation.

2. The method of claim 1, wherein the worst-case scenario simulates demand being misaligned with resource inventory in the omnichannel distribution network based on a worst-case demand uncertainty and fulfillment of a predicted worst-case demand, and wherein the limited best-case scenario simulates one or more portions of the omnichannel distribution network having demand aligned with resource inventory.

3. The method of claim 2, wherein the BIO computer model is configured with a first hyperparameter K that limits a number of portions of the omnichannel distribution network that has demand aligned with resource inventory, and a second hyperparameter $\lambda$ that is a fraction of a demand budget constraint representing a best-case demand portion of a demand budget.

4. The method of claim 1, wherein the adversary component searches over all possible demand realizations in an uncertainty set controlled by a budget constraint, and wherein the ally component, for at least a selected subset of locations within the omnichannel distribution network, simulates a resource supply at that selected subset of locations meeting resource demand at the selected subset of locations.

5. The method of claim 1, wherein the ally component limits the worst-case scenario simulated by the adversary component based on a demand fraction of a budget constraint.

6. The method of claim 1, wherein the BIO computer model simulates an allocation decision problem having three stages comprising:

in stage 1, an allocation of resources is made based on an allied demand determination that aligns resource inventory to demand at locations within the omnichannel distribution network;

in stage 2, the adversary component selects a worst-case adversarial demand condition based on the allocation from stage 1; and in stage 3, the allocation of resources is modified to fulfill demands based on the demands modeled in stages 1 and 2.

7. The method of claim 6, wherein stage 1 is processed as a master problem using a Benders Decomposition technique to model worst-case scenarios, and wherein stages 2 and 3 are combined to generate a complex stage 2 that is processed as a subproblem using the Benders Decomposition technique to generate scenarios to feed to the master problem, and wherein the master problem and subproblem are processed iteratively for different scenarios generated by the subproblem until the master problem and subproblem converge.

8. The method of claim 1, wherein applying the BIO computer model to the hierarchical demand forecast data and current inventory data, comprises:

solving a master problem to calculate tentative inventory purchase quantity and allocations;

updating a best-case demand to all locations within the omnichannel distribution network, and an upper bound value;

solving a sub-problem to identify worst-case demands at all locations within the omnichannel distribution network, and a lower bound value; and iterating the solving of the master problem, the updating, and solving the sub-problem until the upper bound value and the lower bound value converge.

9. The method of claim 8, wherein, in response to the upper bound value and lower bound value converging, scoring resource purchase and allocations of buy quantity based on a validation data set.

10. The method of claim 1, wherein the target resource is a good or product.

11. A non-transitory computer-readable medium storing a set of instructions for generating a resource allocation recommendation in an omnichannel distribution network, the set of instructions comprising:

one or more instructions that, when executed by one or more processors of a device, cause the device to:

retrieve historical and current inventory data related to a target resource and the omnichannel distribution network;

generate, using a machine learning model, a hierarchical demand forecast data, for allocation of resources within the omnichannel distribution network, based at least in part on the historical and current inventory data, wherein the hierarchical demand forecast data comprises online demand computed over a zone comprising a geographic cluster;

instantiate an ally-adversary bimodal inventory optimization (BIO) computer model comprising an adversary component that simulates, through a first computer simulation, a worst-case scenario of resource demand and resource availability, and an ally component that limits the adversary component based on a second computer simulation of a limited best-case scenario of resource demand and resource availability, wherein the BIO computer model is instantiated within a virtual computing environment comprising a plurality of virtual machines and container sets;

execute the first computer simulation and the second computer simulation of the BIO computer model based on the hierarchical demand forecast data and current inventory data as input to the BIO computer model, to generate a predicted consumption for the target resource across a plurality of locations in the omnichannel distribution network, wherein the plurality of locations within the omnichannel distribution network comprises one or more of warehouses, retail stores, or electronic commerce fulfillment centers, and wherein, to execute the first computer simulation and the second computer simulation, the one or more instructions cause the device to perform one or more iterations associated with an objective function, wherein each iteration comprises:

updating a first bound of the objective function based on the limited best-case scenario; and updating a second bound of the objective function based on the worst-case scenario;

generate the resource allocation recommendation for allocating the target resource to locations of the omnichannel distribution network, based on the predicted consumption for the target resource;

output the resource allocation recommendation to a downstream computing system to perform a downstream computing operation based on the resource allocation recommendation, wherein the downstream computing system is an enterprise resource planning (ERP) system for inventory management; and perform a redistribution of physical inventory at one or more nodes of the omnichannel distribution network based at least in part on the resource allocation recommendation.

12. The non-transitory computer-readable medium of claim 11, wherein the worst-case scenario simulates demand being misaligned with resource inventory in the omnichannel distribution network based on a worst-case demand uncertainty and fulfillment of a predicted worst-case demand, and wherein the limited best-case scenario simulates one or more portions of the omnichannel distribution network having demand aligned with resource inventory.

13. The non-transitory computer-readable medium of claim 12, wherein the one or more instructions cause the device to configure the BIO computer model with a first hyperparameter K that limits a number of portions of the omnichannel distribution network that has demand aligned with resource inventory, and a second hyperparameter $\lambda$ that is a fraction of a demand budget constraint representing a best-case demand portion of a demand budget.

14. The non-transitory computer-readable medium of claim 11, wherein the one or more instructions cause the adversary component to search over all possible demand realizations in an uncertainty set controlled by a budget constraint, and wherein one or more instructions cause the ally component to simulate, for at least a selected subset of locations within the omnichannel distribution network, a resource supply at that selected subset of locations meeting resource demand at the selected subset of locations.

15. The non-transitory computer-readable medium of claim 11, wherein the ally component limits the worst-case scenario simulated by the adversary component based on a demand fraction of a budget constraint.

16. The non-transitory computer-readable medium of claim 11, wherein the one or more instructions cause the BIO computer model to simulate an allocation decision problem having three stages comprising:

in stage 1, an allocation of resources is made based on an allied demand determination that aligns resource inventory to demand at locations within the omnichannel distribution network as much as possible;

in stage 2, the adversary component selects a worst-case adversarial demand condition based on the allocation from stage 1; and in stage 3, the allocation of resources is modified to fulfill demands based on the demands modeled in stages 1 and 2.

17. The non-transitory computer-readable medium of claim 16, wherein stage 1 is processed as a master problem using a Benders Decomposition technique to model worst-case scenarios, and wherein stages 2 and 3 are combined to generate a complex stage 2 that is processed as a subproblem using the Benders Decomposition technique to generate scenarios to feed to the master problem, and wherein the master problem and subproblem are processed iteratively for different scenarios generated by the subproblem until the master problem and subproblem converge.

18. The non-transitory computer-readable medium of claim 11, wherein to apply the BIO computer model to the hierarchical demand forecast data and current inventory data, the one or more instructions cause the device to:

solve a master problem to calculate tentative inventory purchase quantity and allocations;

update a best-case demand to all locations within the omnichannel distribution network, and an upper bound value;

solve a sub-problem to identify worst-case demands at all locations within the omnichannel distribution network, and a lower bound value; and iterate the solving of the master problem, the updating, and solving the sub-problem until the upper bound value and the lower bound value converge.

19. The non-transitory computer-readable medium of claim 18, wherein, in response to the upper bound value and lower bound value converging, the one or more instructions cause the device to score resource purchase and allocations of buy quantity based on a validation data set.

20. An apparatus comprising:

one or more processors; and one or more memory devices coupled to the one or more processors, wherein the one or more processors are configured to:

retrieve historical and current inventory data related to a target resource and an omnichannel distribution network;

generate, with a machine learning model, a hierarchical demand forecast data, for allocation of resources within the omnichannel distribution network, based at least in part on the historical and current inventory data, wherein the hierarchical demand forecast data comprises online demand computed over a zone comprising a geographic cluster;

instantiate an ally-adversary bimodal inventory optimization (BIO) computer model comprising an adversary component that simulates, through a first computer simulation, a worst-case scenario of resource demand and resource availability, and an ally component that limits the adversary component based on a second computer simulation of a limited best-case scenario of resource demand and resource availability, wherein the BIO computer model is instantiated within a virtual computing environment comprising a plurality of virtual machines and container sets;

execute, by the one or more processors, the first computer simulation and the second computer simulation of the BIO computer model based on the hierarchical demand forecast data and current inventory data as input to the BIO computer model, to generate a predicted consumption for the target resource across a plurality of locations in the omnichannel distribution network, wherein the plurality of locations within the omnichannel distribution network comprises one or more of warehouses, retail stores, or electronic commerce fulfillment centers, and wherein, to execute the first computer simulation and the second computer simulation, the at least on processor is configured to perform one or more iterations associated with an objective function, wherein each iteration comprises:

updating a first bound of the objective function based on the limited best-case scenario; and updating a second bound of the objective function based on the worst-case scenario;

generate a resource allocation recommendation for allocating the target resource to locations of the omnichannel distribution network, based on the predicted consumption for the target resource;

output the resource allocation recommendation to a downstream computing system to perform a downstream computing operation based on the resource allocation recommendation, wherein the downstream computing system is an enterprise resource planning (ERP) system for inventory management; and perform a redistribution of physical inventory at one or more nodes of the omnichannel distribution network based at least in part on the resource allocation recommendation.

* * * * *